(12) United States Patent
Geiger

(10) Patent No.: US 6,652,181 B1
(45) Date of Patent: Nov. 25, 2003

(54) UNIVERSAL CONNECTING SYSTEM

(75) Inventor: Hans-Peter Geiger, Dürnau (DE)

(73) Assignee: Robert Piersch Edelstahltechnik GmbH, Hawangen (DE)

(*) Notice: Subject to any disclaimer, the term of this patent is extended or adjusted under 35 U.S.C. 154(b) by 0 days.

(21) Appl. No.: 09/762,610

(22) PCT Filed: Oct. 20, 1999

(86) PCT No.: PCT/EP99/08395

§ 371 (c)(1),
(2), (4) Date: Feb. 7, 2001

(87) PCT Pub. No.: WO00/77321

PCT Pub. Date: Dec. 21, 2000

(30) Foreign Application Priority Data

Jun. 9, 1999 (DE) .................................... 299 09 995 U
Aug. 7, 1999 (DE) .................................... 299 13 839 U

(51) Int. Cl.[7] .............................................. F16L 25/00
(52) U.S. Cl. ...................................... 403/297; 285/127.1
(58) Field of Search ................................ 403/297, 337, 403/408.1; 285/127.1, 132.1, 133.11, 196, 216, 338, FOR 133, FOR 137, FOR 139

(56) References Cited

U.S. PATENT DOCUMENTS

| | | | |
|---|---|---|---|
| 1,993,307 A | * 3/1935 | Nicholson | 285/338 X |
| 2,214,177 A | 9/1940 | Raybould | |
| 3,402,951 A | * 9/1968 | Kleb | 403/408.1 X |
| 4,856,929 A | * 8/1989 | Smahlik et al. | 403/297 |
| 4,958,953 A | * 9/1990 | Charondiere | 403/297 |
| 5,018,900 A | * 5/1991 | Darrin | 403/267 |

FOREIGN PATENT DOCUMENTS

| | | | | |
|---|---|---|---|---|
| AU | 111297 | * | 8/1940 | ........... 403/297 |
| CH | 564930 | * | 8/1975 | ........... 403/297 |
| DE | 195 25 334 | | 7/1996 | |
| DE | 195 25 334 A | | 7/1996 | |
| DE | 297 09 986 | | 9/1997 | |
| DE | 196 49 064 A | | 6/1998 | |
| DE | 196 49 890 A | | 6/1998 | |
| DE | 298 11 026 | | 10/1998 | |
| EP | 0 564 889 A | | 10/1993 | |

* cited by examiner

Primary Examiner—Greg Binda
(74) Attorney, Agent, or Firm—McGlew and Tuttle, P.C.

(57) ABSTRACT

A universal connection system for pipe connections provides a universal connection system for pipe ends with straight cut and/or miter cut as well as with a miter cut with radii made in one piece for straight, T-shaped, crossed as well as acute-angled and obtuse-angled pipe connections as well as for pipe ends with elbows, pipe bends, sections, hollow sections and plates with invisible connection elements. The system is also suitable for pipe systems for ducting cables and for carrying all types of gaseous and liquid media. The system includes clamping systems (2) or clamping systems (2) coupled with straight or hinge-shaped connection elements with axially and radially movable tie-in points. Threaded bolts, that (6) can be arranged centrally, straight, T-shaped and crossed and acute-angled and obtuse-angled connections of pipe sections (8) with one another or of pipe sections (8) with solid sections, elbows, pipe bends, plates and the like can be easily mounted and are invisible. An additional clamping system (40) screwed together with an inner connecting sleeve with axially and radially acting seals makes possible a smooth, center-free pipe transition especially for liquids and gases.

10 Claims, 26 Drawing Sheets

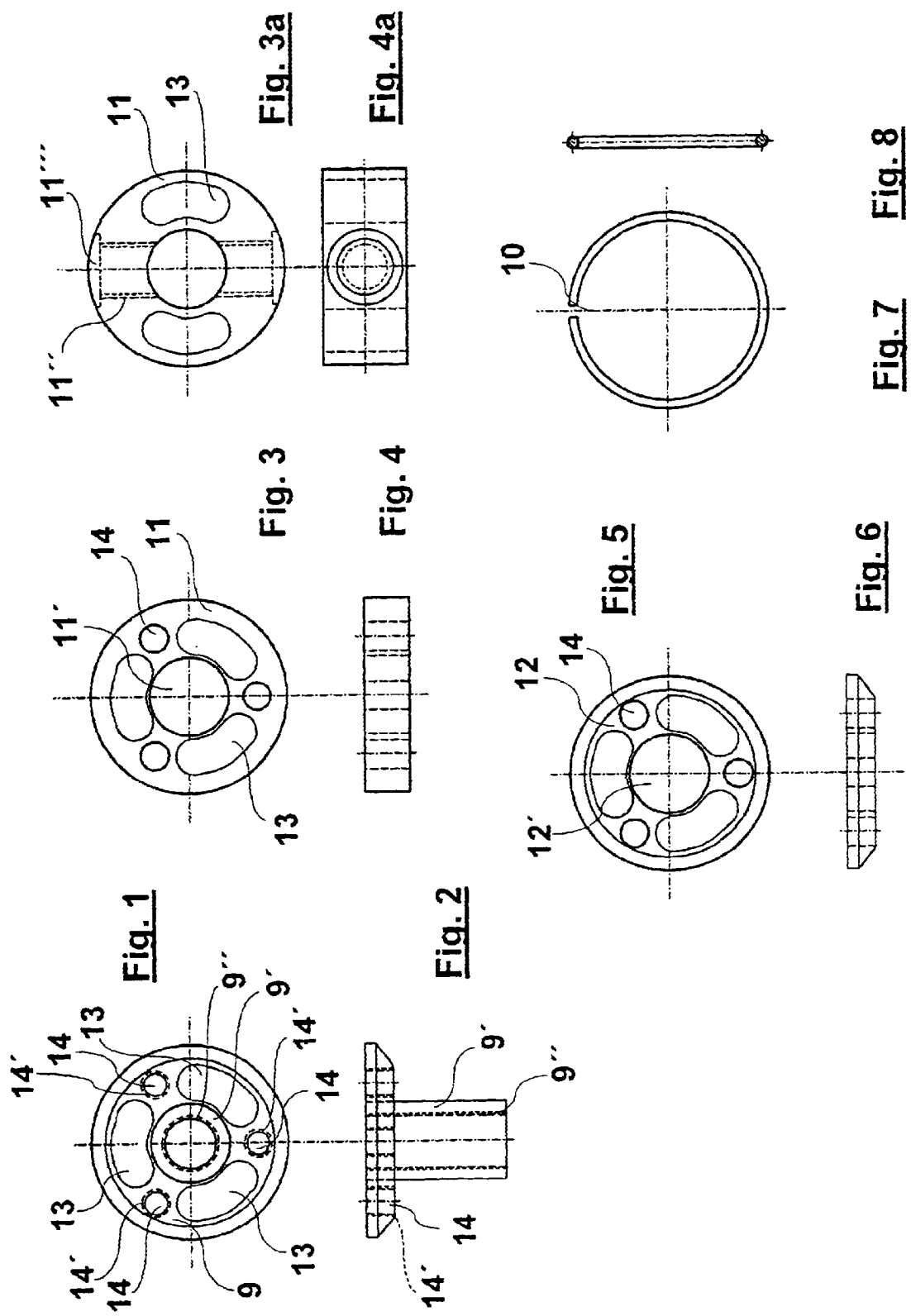

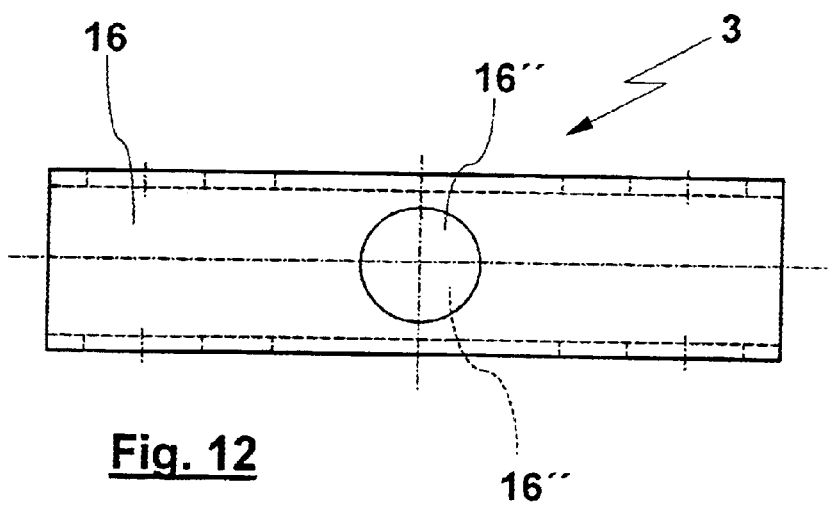
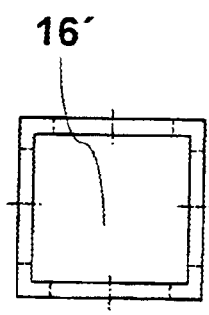
Fig. 12  Fig. 13
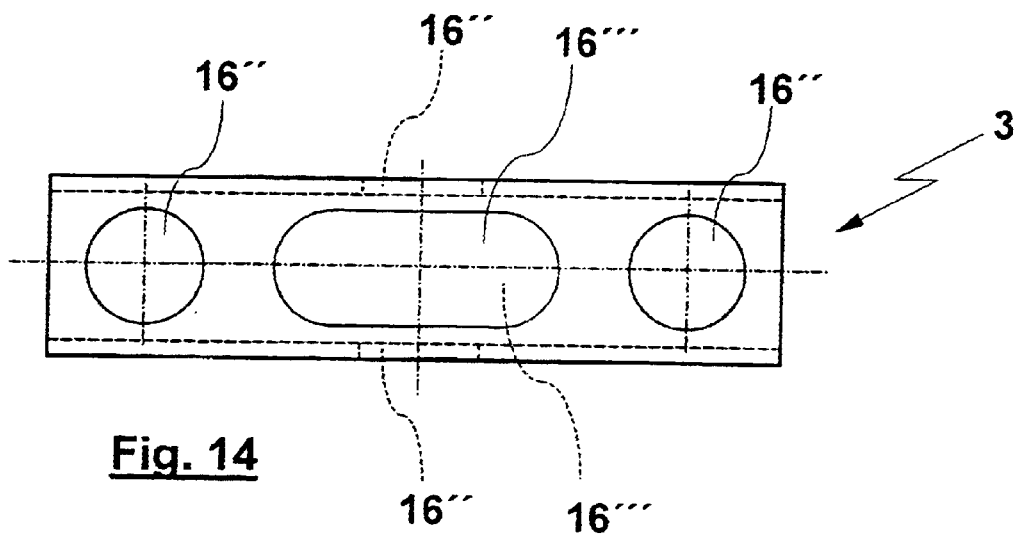
Fig. 14
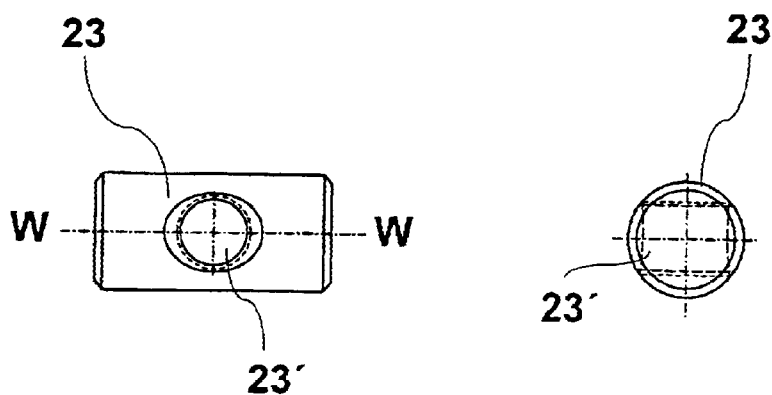
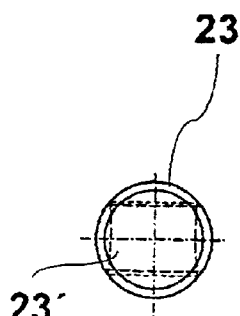
Fig. 15  Fig. 16

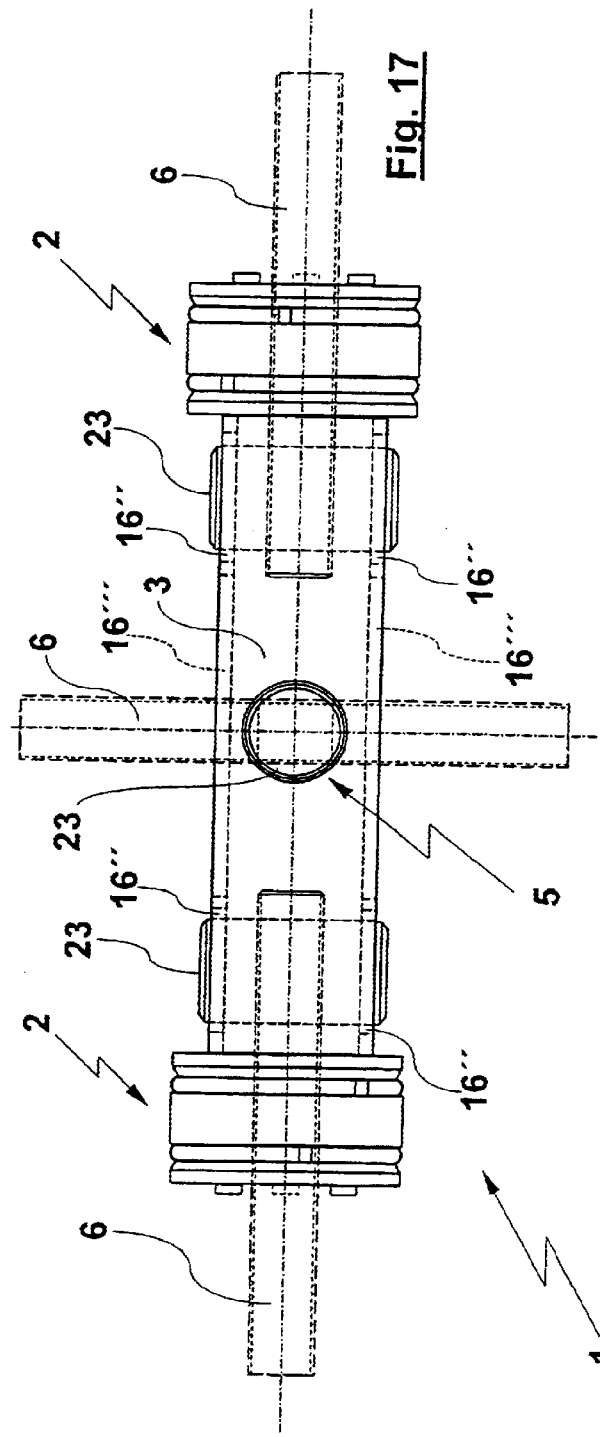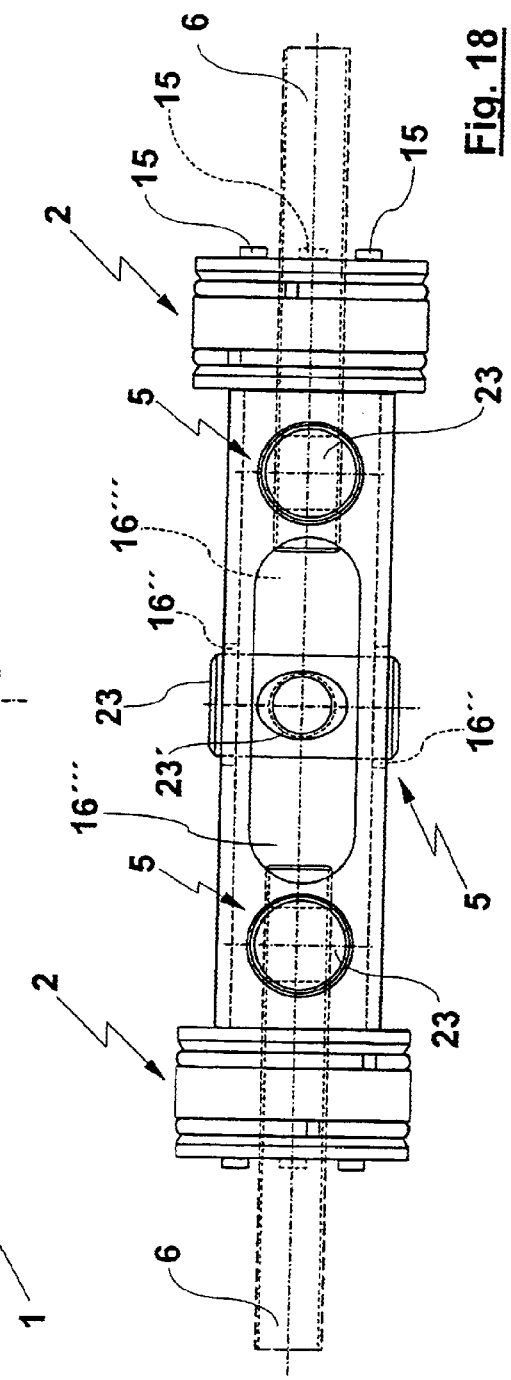

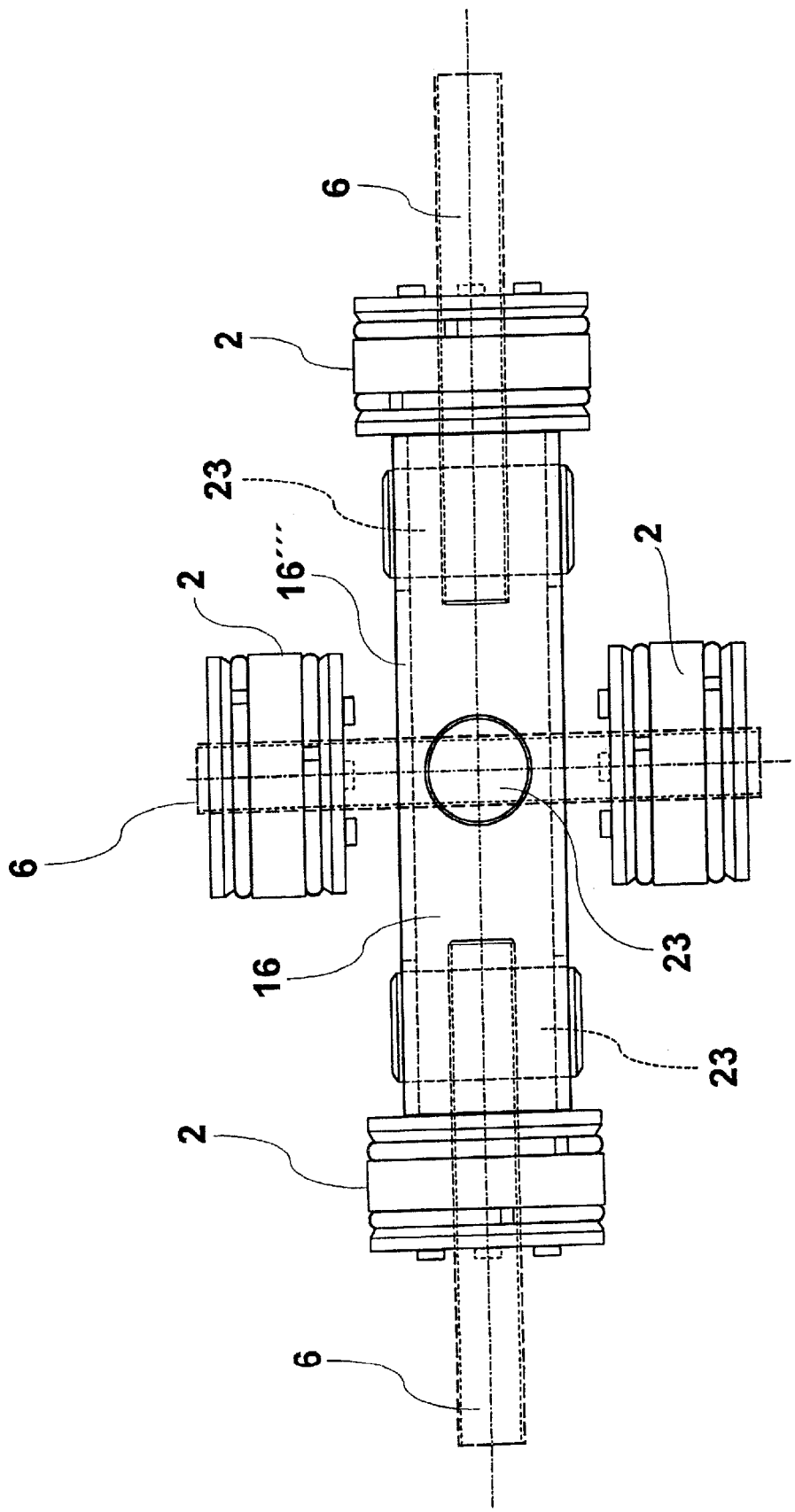

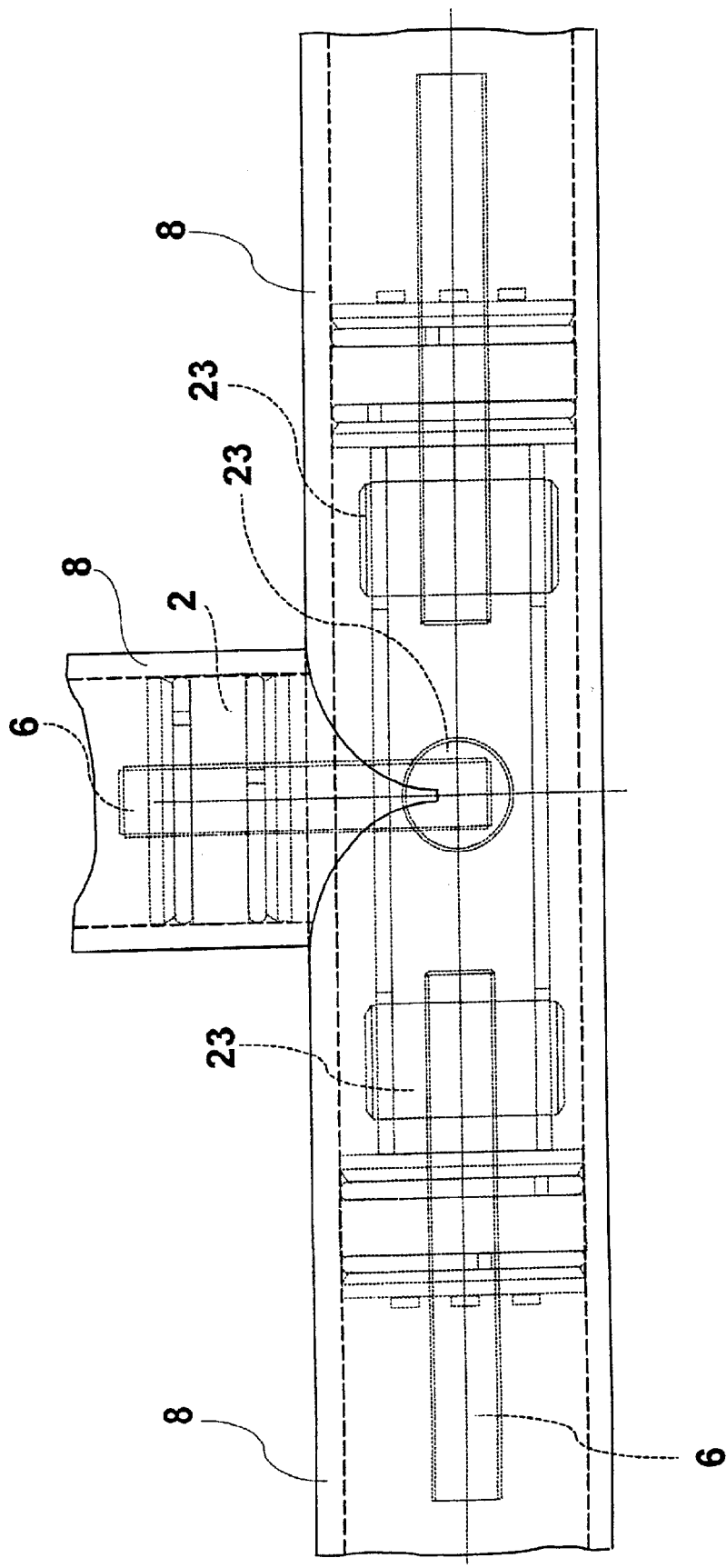

Schnitt A-A

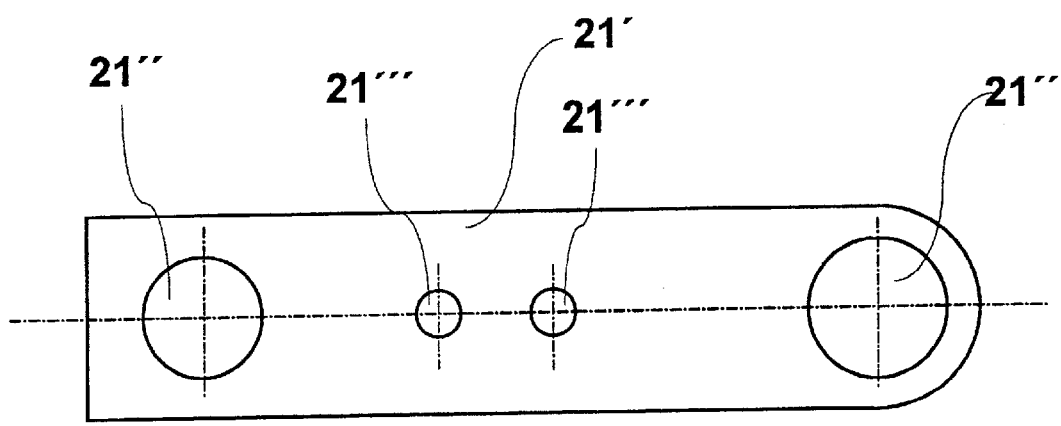
Fig. 25
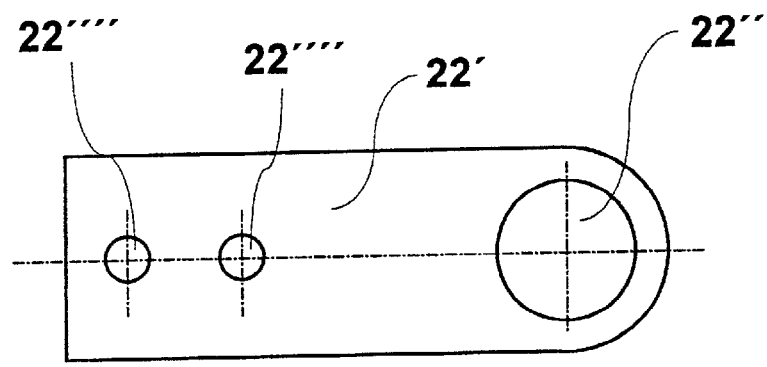
Fig. 26
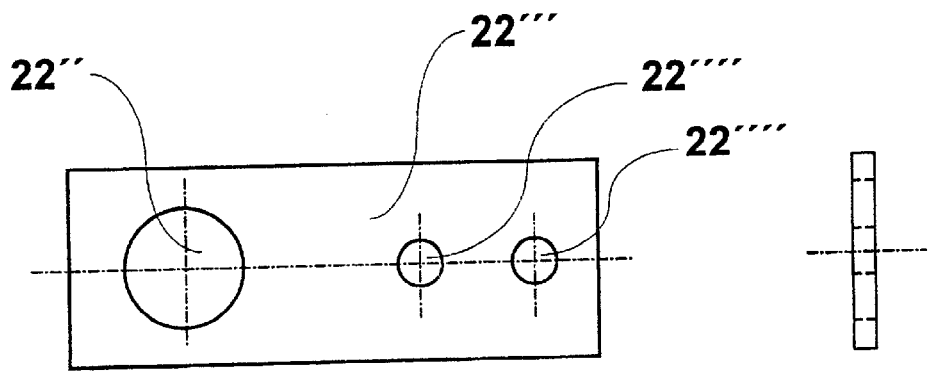
Fig. 27　　　　　　　　　　　Fig. 28

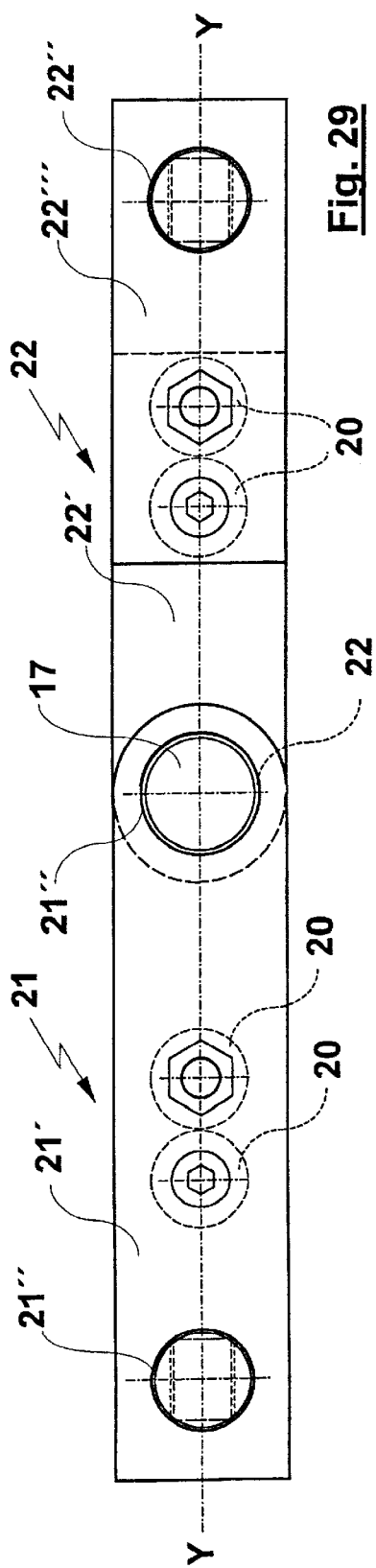
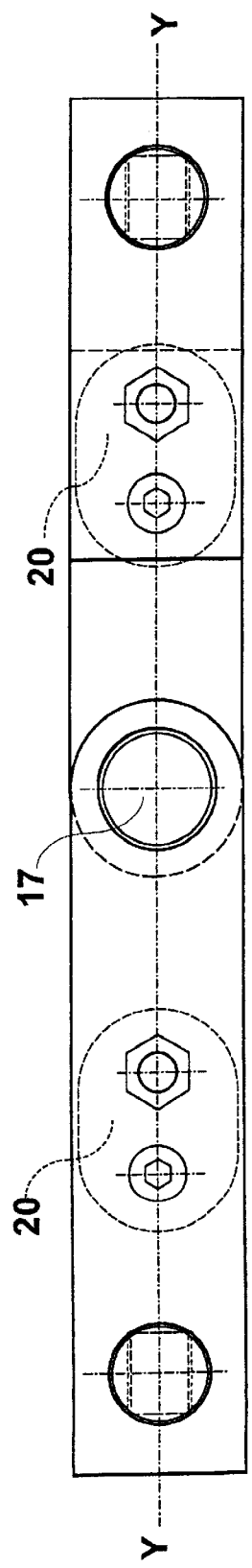
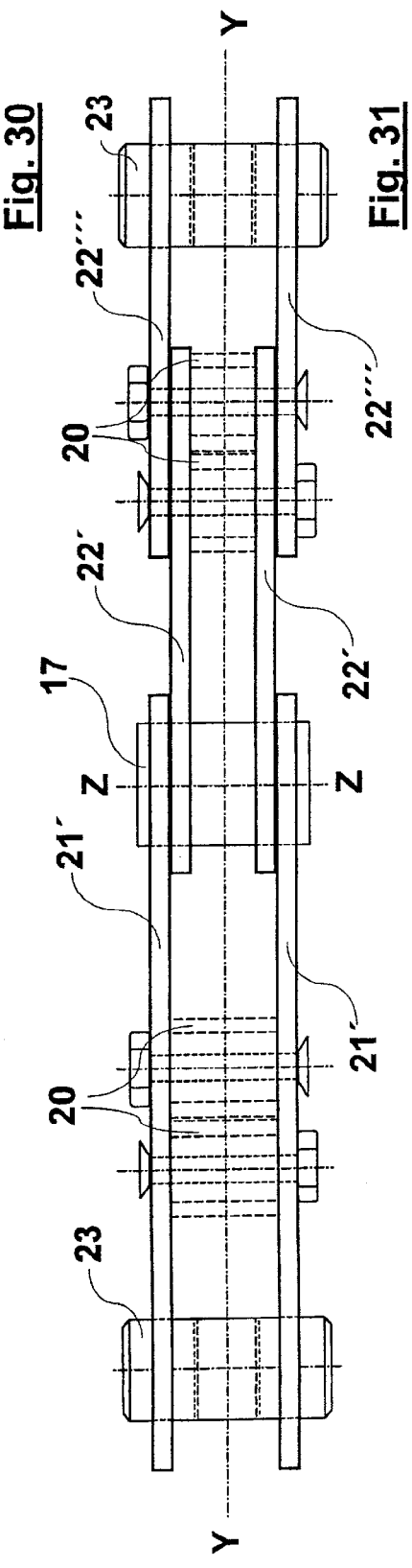

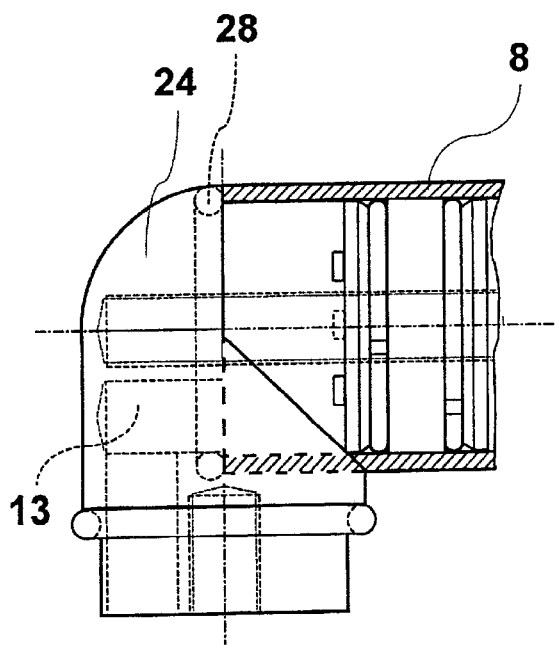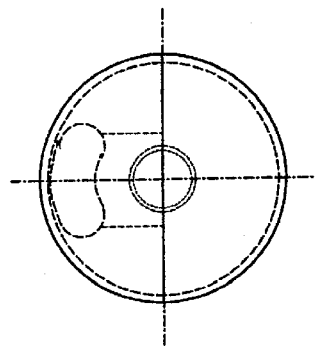
Fig. 37      Fig. 37a
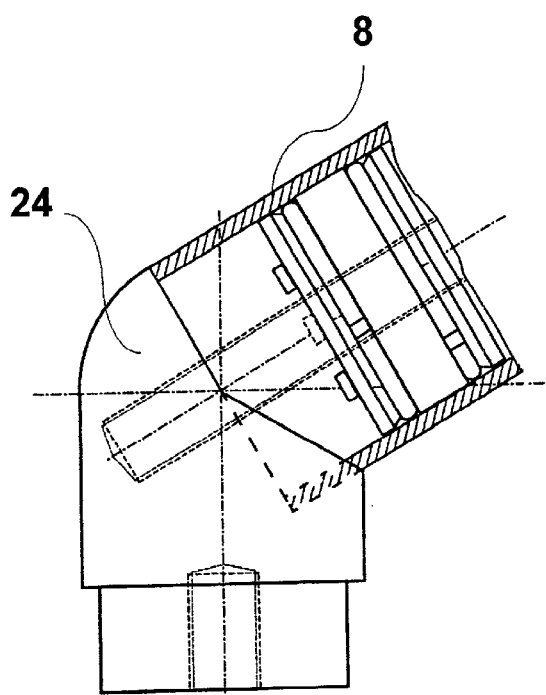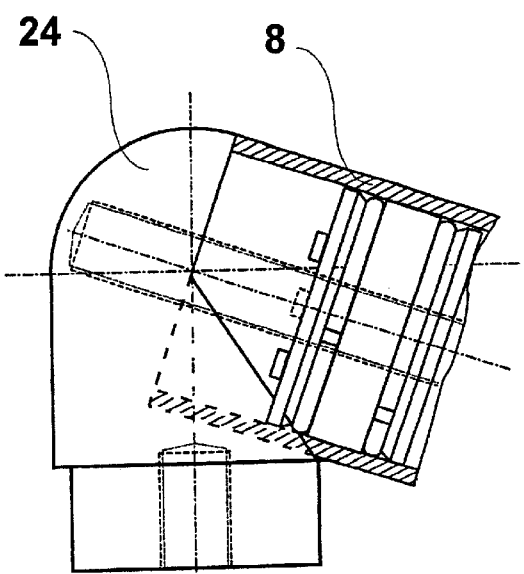
Fig. 38      Fig. 39

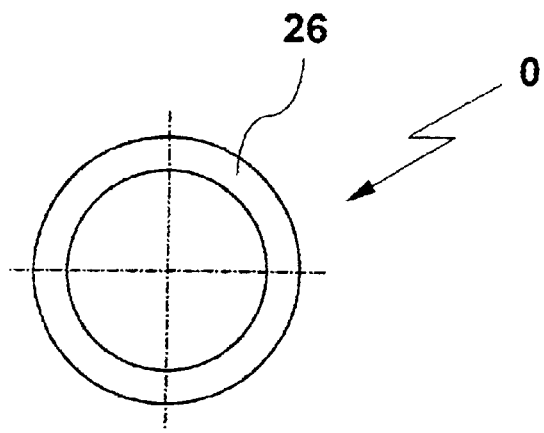
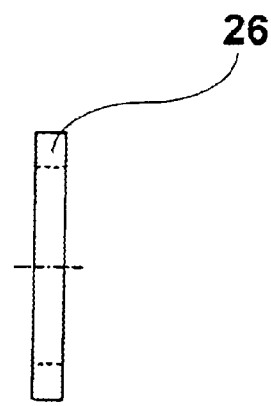
Fig. 40
Fig. 40a
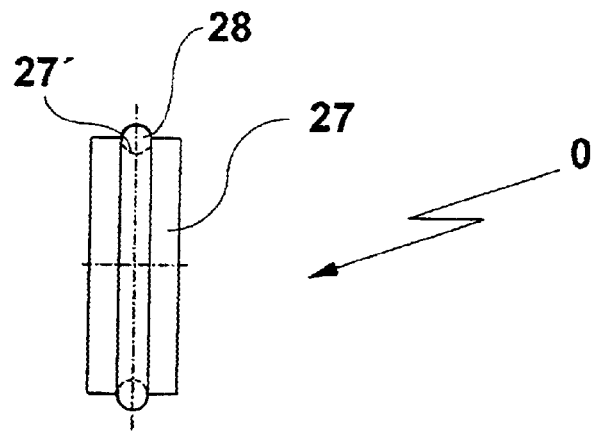
Fig. 41
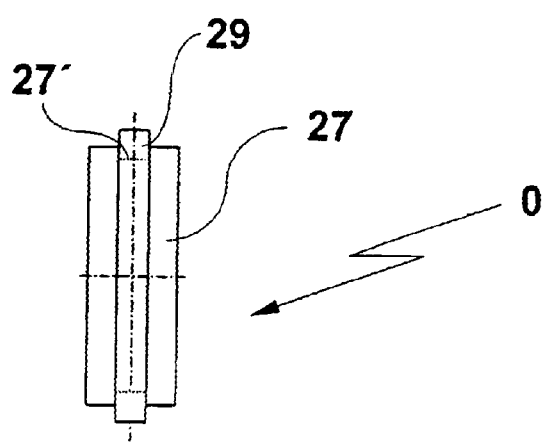
Fig. 42

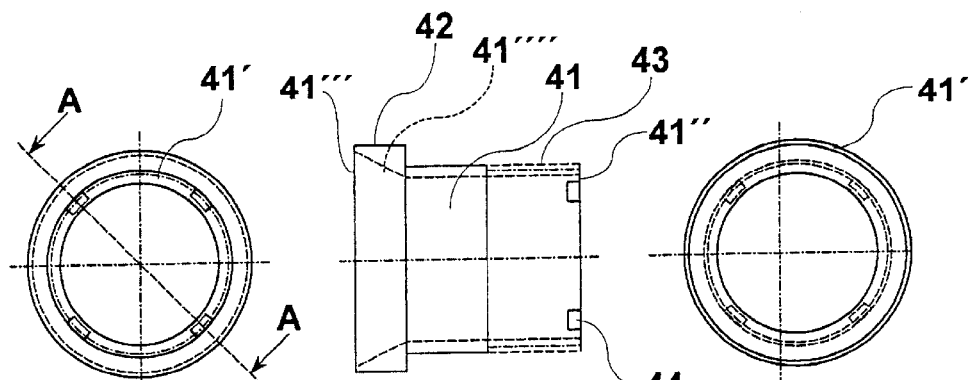
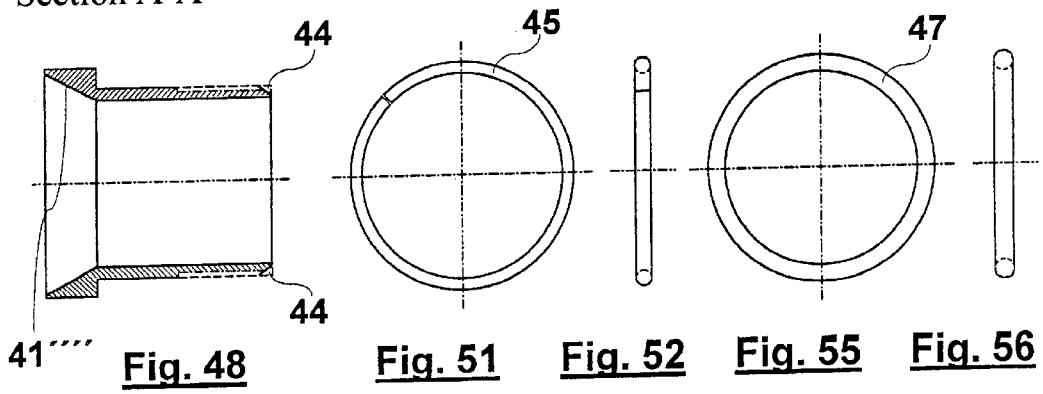
Section A-A
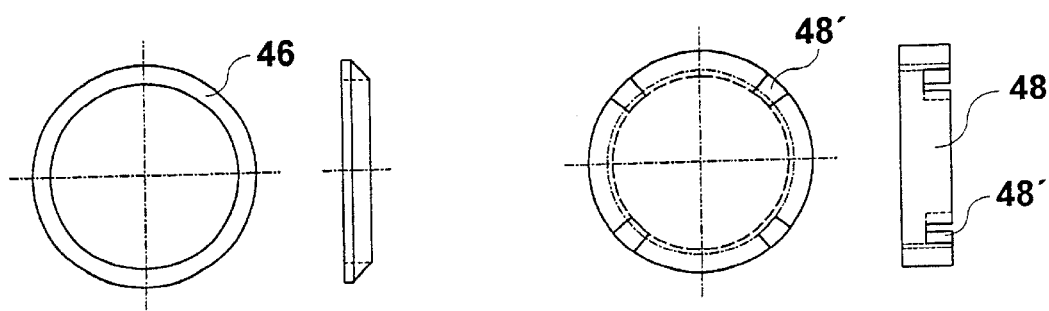

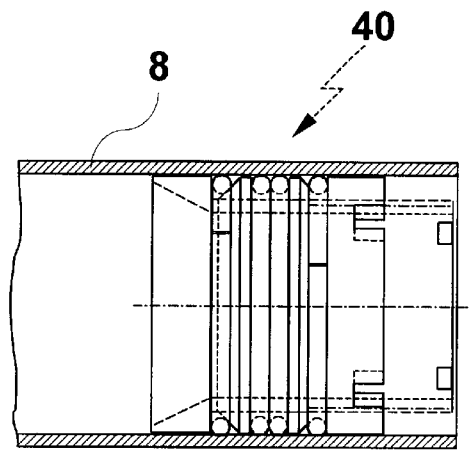
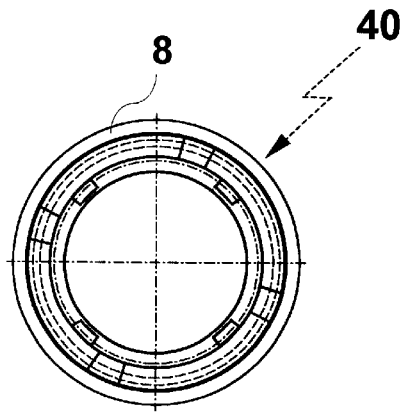
Fig. 66          Fig. 67
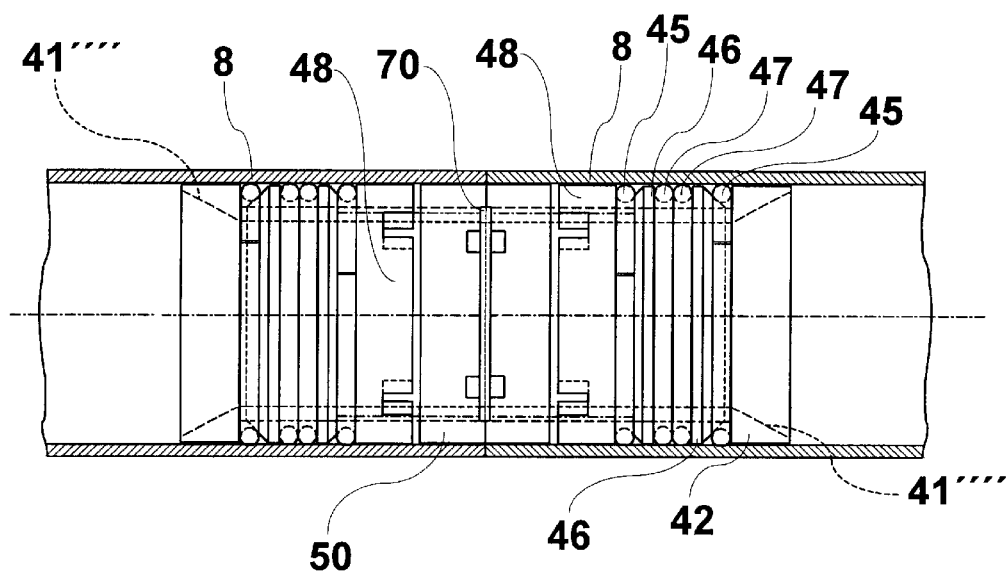
Fig. 68

UNIVERSAL CONNECTING SYSTEM

FIELD OF THE INVENTION

The present invention pertains to a universal connection system for connecting pipes joined together, pipe ends provided with a straight cut and/or with a miter cut for straight, crossed, T-shaped as well as acute-angled and obtuse-angled pipe connections as well as for connecting pipes with elbow, pipe bends, sections, hollow sections and plates, as shaping elements, such as handrails, exhibition and display elements, for pipe systems for ducting cables as well as for all types of gaseous and liquid media.

BACKGROUND OF THE INVENTION

Systems for connecting pipes have been known, in which the locations of the joints are connected to one another by connecting sleeves or union nuts. Standardized connection elements such as T-pieces, elbows and pipe bends, which must be provided with internal threads at the end and into which pipe ends provided with external threads are screwed, are used to connect pipes in angular areas of rooms. These systems have the drawback that the pipe connection is visible and unattractive from the outside and the manufacture and mounting is complicated and expensive. Welded pipe connections are known as well, and even though they guarantee relatively flat transitions at the connection points, they must be destroyed if repair becomes necessary or if the course of the pipeline must be changed, and deformation and above all destruction of the surface protection, which cannot be repaired, usually occur.

A pipe connection system has been known from DE 297 09 986 U1, which provides for the connection of a pipe section especially of stair handrails and the like with a spherical corner part, which has at least one threaded hole with a hole axis extending through the center of the sphere, where the connection pin has, on the sphere side, a recess with a support surface adapted in some areas to the spherical surface and a hole opening in the area of the recess for a fastening screw which can be screwed into the threaded hole and whose screw head is supported on a curved abutment surface of the connection pin, whose radius originates from the center of the sphere with the connection pin brought into contact with the sphere, wherein a special abutment is designed, which is introduced into the interior of a pipe and is screwed by the front-side opening of the pipe to the spherical corner part. The drawback of this system is that the abutment requires a specially shaped pipe end which is used as an abutment within the pipe. The manufacture of such a pipe connection is complicated and expensive.

DE 195 25 334 A1 discloses the design of a kit comprising various round rods for building a round rod system bent at right angles. To make do with the smallest possible number of round rods of a compact design, it is proposed that the round rod be provided at least at one end of the rod with a hemispherical closure, which has the same radius as the round rod in order to recess circular cylindrical recesses in this closure. The cylinder radius of the recess is equal to the radius of the circular section of the round rod and intersects the axis of the cylinder in the axis of the rod. A sickle-shaped segment is thus formed in the inner angle area between the intersecting axes of the rod and the cylinder. This solution is an elegant connection for round sections, which can be assembled with one another by means of threaded bolts. However, they are not suitable for pipes due to their designed central screw connection and their manufacture is complicated and expensive.

DE 298 11 026 U1 discloses a connection system for pipes, which is characterized by a spreadable sleeve, which is arranged in at least one pipe end, where the said pipes are connected to one another by conical washers arranged on both sides and a spacing washer by means of a centrally arranged setscrew and in which system the spreadable sleeve is axially clamped in the pipe by a mounting pin that can be screwed radially into the spacing washer. The spacing washer with the opening for the mounting pin can be seen between two pipe joints in the assembled state. Additional spacers and split fittings with different angles are needed for a T-shaped pipe connection or a connection with pipe bends. This pipe connection is based on a central connection of the clamped parts, which closes the pipe system at the connection points. These pipe connections are not suitable for pipe systems in which gaseous or liquid media are to be carried or cables are to be ducted. In addition, each pipe connection is characterized by the spacing washer, which is visible from the outside and is arranged between pipe ends, which is optically disturbing and questionable in terms of safety engineering because the connection point is recognizable and accessible to anyone.

SUMMARY AND OBJECTS OF THE INVENTION

The basic object of the present invention is therefore to provide a universal connection system with invisible connection elements for pipes joined together with straight cut and/or with miter cut as well for pipe ends provided with a miter cut with radii made in one piece for straight, T-shaped, crossed as well as acute-angled and obtuse-angled pipe connections as well as for connection pipes to elbows, pipe bends, sections, hollow sections and plates, which is also suitable for pipe systems for ducting cables as well as for carrying all types of gaseous and liquid media.

According to the invention, the connection system comprises clamping systems and/or clamping systems coupled with straight and/or hinge-shaped connection elements with axially and radially movable tie-in points which can be provided and which are to be connected to one another in a great variety of manners by threaded bolts which can be arranged centrally. A simple design of the individual parts and their connection is provided. It makes possible an extremely inexpensive manufacture of the individual parts and simple assembly. The variable usability of the clamping systems alone as well as in conjunction with additional clamping systems and/or with various connection elements with axially and radially movable tie-in points arranged as needed guarantees, due to the arrangement of threaded bolts, a straight, T-shaped and crosswise as well as acute-angled and obtuse-angled connection of pipe sections with one another or of pipe sections with solid sections, elbows, pipe bends, plates and the like, which said connection can be assembled in a simple manner. The clamping systems and connection elements, which are designed as permeable, and pipe connections provided with sealing elements make possible the use of the universal connection system not only for shaping elements such as handrails and display elements, but also for pipe systems for ducting cables as well as for carrying gaseous and liquid media.

A special advantage of the universal connection system according to the present invention is that it can be locked from the open front sides of the pipes and completely disappears in the pipes, as a result of which a pipe connection point meeting any optical requirements and all safety engineering requirements concerning unauthorized tampering with such a connection are met.

The design of the clamping systems, in particular, makes possible the preassembly of the clamping system before use in the pipe, as a result of which the mounting of the pipe connections is simplified and thus it can be carried out at a low cost. Due to an axial three-screw tension distributed on the circular areas of the connection, the connection of the clamping system ensures an absolutely stable and adaptable radial tension in the pipe, which tension equalizes especially unevennesses in the inner pipe. The passage openings arranged in the clamping system and distributed over the circular areas form channels, which ensure the permeability for gaseous and liquid media or for ducting cables. The clamping systems can be used only as a straight connection element and, in a second embodiment of the ring washer with radially arranged through threaded hole, the clamping systems may also be used for a T-shaped and crossed connection only. The through hole arranged centrally in the parts of the clamping systems and provided with internal thread makes possible a simple screw connection by means of threaded bolts of various lengths with additional clamping systems or connection elements according to an embodiment as well as their ready radial locking with tightening screws arranged axially in the clamping systems or with nuts arranged on the end side on a central threaded bolt, by means of straining rings in the pipe.

The connection element according to an embodiment is also advantageous; due to its hollow section and the end-side and central as well as crosswise mounts for arranging tie-in points according to an embodiment, it makes it possible to prepare not only a straight, T-shaped or crossed pipe connection, but also and especially a pipe connection which can be regulated easily and individually in the pipe during mounting along the axis of the pipe and can be an acute-angled and obtuse-angled pipe connection whose slope angle can be adjusted as needed in the range of 180° on both sides of the pipe axis according to another embodiment, which can likewise be locked via the open front sides of the pipe sections. In addition, other elements such as solid sections, plates or tumbuckles may also be arranged directly at the central tie-in point of this connection element according to an embodiment by means of threaded bolts made in one piece with or screwed into the elements.

The radially pivotable connection element according to an embodiment is particularly advantageous because it comprises two hinge legs which are connected to one another by a hinge pin and are provided at their free leg ends with mounts each for the arrangement of tie-in points and which can be connected to clamping systems by means of threaded bolts and make possible, besides straight pipe connections, especially pipe connections which can have bends in the range of <45° to 180° on both sides in relation to the axes of the hinge legs. One embodiment provides a compact and short form of the hinge legs and the second embodiment provides an extended form of the hinge legs. Even though the second embodiment somewhat limits the minimum angular position of the hinge legs in relation to one another, it also guarantees stable locking in an angular pipe connection which is exposed to especially high loads.

The tie-in points according to an embodiment, which are arranged on the connection elements, should be pointed out as well; they comprise a hinge pin designed as a turned part with a central threaded through hole arranged at right angles to the axis of the pin, which can be inserted into two oppositely arranged mounting points of the connection elements such that it is axially and radially movable. Due to the mobility of the tie-in points, a threaded bolt screwed into the hinge pin can also perform a radial movement axially and radially. This possibility of mobile arrangement supports an adaptable radial centering and spreading of the clamping systems preassembled with connection elements in the pipe sections even if the inner pipe jackets have certain unevennesses.

Furthermore, the variability of the universal connection system according to the present invention is characterized by its ability to be combined with elements according to an embodiemt, e.g., also with turnbuckles, which is made possible by a left-handed thread which can be provided in the clamping systems and stresses the versatile applicability of the connection system.

An advantageous embodiment of the pipe ends with a chamfer extending toward the center of the pipe according to an embodiment guarantees such an accurate connection point in the case of pipe connections for shaping elements or for cable ducts that it is not disturbing at all if the pipe system is formed by many short pipe sections. In addition, this has the advantage that the pipe sections can be subjected to surface treatment without problems and shaping requirements, even gold-plating, can be easily complied with.

Another advantageous embodiment of the pipe ends with a two-step chamfer extending toward the center of the pipe according to an embodiment is especially suitable for pipe systems which are intended for carrying liquid or gaseous media. Sealing elements are arranged in the second step of the chamfers within the pipes, and the sealing elements according to an embodiment may have different shapes corresponding to different requirements.

The closure of pipe system ends according to an embodiment by means of a machine screw with a plain washer placed under it and with a sealing element inserted on the clamping system instead of the last straining ring supports the flexibility of the universal connection system especially in the case of pipe systems carrying gaseous and liquid media.

The design of the universal connection system according to an embodiment is particularly advantageous. The design of the clamping systems used here, which are screwed to an inner connecting sleeve and are equipped with axially and radially acting seals, guarantees, on the one hand, a flat, center-free axial pipe passage at the pipe transitions, which passes slidingly over into the internal pipe diameter on both sides of the connection system, and, on the other hand, an axially and radially acting liquid- and gas-tight and pressure-sealed pipe connection. Not only does this embodiment of the universal connection system make possible an invisible, optically attractive pipe connection but it also ensures, especially in the case of use in the food industry, that liquid or fluid residues will not be left at the pipe connections and the associated risk of the growth of bacteria or the accumulation of media residues and the accompanying clogging of the pipes will be avoided. The sealing provided between the front surfaces of the clamping systems may be a ring seal or a sheet gasket, which may consist of various materials, e.g., copper, but is also heat resistant up to 900° C. in the case of thin-walled pipes for heated media, and for foods, it consists of Gylon 3501 E, which is also heat resistant up to 230° C. and it consists of vulcanized fiber for acids or alkalies. The use of materials for the seals according to the needs has no adverse effects on tightness, but it considerably broadens the scope of use of the connection system.

The clamping systems according to an embodiment are designed such that all parts which form unevennesses on the surface, such as straining rings, conical rings, sealing rings and ring nuts, are kept away from the inside of the pipe by mounting cylinders, which are flat on the inside. Moreover, the chamfer prepared on the inside of the collar of the mounting cylinder, guarantees the nearly continuous transition of the pipe connection to the internal pipe diameter of the pipe sections connected to one another. The chamfer segments, which are prepared axially on a front surface of the mounting cylinder, interrupt the external thread in these areas and guarantee the front-side locking and bracing of the clamping system are finally also hidden by the seal arranged between the front surfaces of the clamping systems within the inner connecting sleeve, which seal consists of a material adapted to the particular medium. In a second embodiment, the mounting cylinder is provided on one side, in the inner area of the collar, with a central threaded hole and with passage openings arranged radially around same, which also makes possible all types of non-straight pipe connections, besides the rather uncomplicated front-side bracing technique of the clamping systems with the locknut wrench.

The clamping systems according to an embodiment can be preassembled very easily without special prior know-how and locked in the pipe sections to be connected with a locknut wrench by screwing the ring nut against the collar of the mounting cylinder. The straining rings are now pressed radially against the inner walls of the pipe via the conical surface of the conical rings and the clamping systems are locked and braced. At the same time, the radial sealing of the clamping systems within the pipes at a pipe joint to be connected takes place during this operation, which is guaranteed by the sealing rings which are arranged on the mounting cylinder between the conical rings and which are pressed together axially flatly by the firm tightening of the ring nut against the collar of the mounting cylinder, and their remaining material surface at the outer ring undergoes such a structural change due to the pressing operation that they press the inner pipe jacket very tightly. At the same time, the axial liquid-, gas- and pressure-resistant sealing of the connection system is guaranteed by the screwing together of the clamping systems via the inner connecting sleeve and the seal, which is arranged between the front surfaces of the mounting cylinders within the inner connecting sleeve and whose material and shape are adapted to the particular medium.

The locknut wrench and its use according to embodiments comprises two ring socket wrenches which can be rotated around an axis and whose shape and size are adapted to the particular embodiment of the mounting cylinders and the ring nuts. It ensures a simple locking and tensioning of the clamping systems in the pipe ends, which are to be joined together in an abutting relationship and prevents tampering with the pipe connection by unauthorized persons.

Finally, the fact that all parts of the universal connection system are manufactured from stainless steel and the sealing elements are manufactured from acid-resistant material according to an embodiment guarantees that damage due to corrosion is ruled out and any type of surface treatment as well as connections with all materials and the carrying of gases and liquids, even those that are corrosive, e.g., acids and alkalies, or those that have to be compatible with foods, are possible in the pipe systems. Moreover, the exclusive use of sections and/or turned and milled parts as well as the use of standardized parts simplifies the manufacturing and mounting process and ensures an extremely inexpensive manufacture, mounting and maintenance of the universal connection system.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

FIG. 1 is a front view of the mounting ring washer of the clamping system according to the invention;

FIG. 2 is a side view of FIG. 1;

FIG. 3 is a front view of the ring washer of the clamping systems according to the invention;

FIG. 3a is a front view of a second embodiment of the ring washer of the clamping system according to the invention;

FIG. 4 is a side view of FIG. 3;

FIG. 4a is a side view of FIG. 3a;

FIG. 5 is a front view of the end ring washer of the clamping system according to the invention;

FIG. 6 is a side view of FIG. 5;

FIG. 7 is a front view of a straining ring of the clamping system according to the invention;

FIG. 8 is a side view of FIG. 7;

FIG. 12 is a front view of a straight T-shaped and crossed connection element according to the invention;

FIG. 13 is a side view of FIG. 12;

FIG. 14 is a top view of FIG. 12;

FIG. 15 is a front view of a hinge pin with central threaded hole according to the invention;

FIG. 16 is a side view of FIG. 15;

FIG. 17 is a front view of a connection element preassembled with crossed threaded bolt and straight end-side clamping systems according to the invention;

FIG. 18 is a top view of FIG. 17;

FIG. 19 is a view according to FIG. 17 with clamping systems arranged crosswise by means of threaded bolts;

FIG. 23a is a view of a T-shaped pipe connection with a pipe end provided with a miter cut with an identical radius made in one piece on both sides;

FIG. 25 is a front view of a second embodiment according to the invention of a segment of a hinge leg of a radially pivotable connection element;

FIG. 26 is a front view of a segment of the other hinge leg;

FIG. 27 is a front view of a second segment of the other hinge leg;

FIG. 28 is a side view of a segment of hte hinge leg;

FIG. 29 is a front view of the second embodiment of a mounted, radiallly pivotable connection element provided with a hinge pin in a linear view;

FIG. 30 is a view of a second front view of the second embodiment according to the invention of a mounted, radially pivotable connection element provided with a hinge pin with a spacer segment in a linear view;

FIG. 31 is a top view of FIG. 29;

FIG. 37 is a front view of an obtuse 90° pipe connection with clamping systems, sealing element; threaded bolt and with a elbow with through channel;

FIG. 37a is a top view of FIG. 37;

FIG. 38 is a view of a 45° pipe connection without sealing element and through channel;

FIG. 39 is a view of a 120° pipe connection from FIG. 38;

FIG. 40 is a front view of a cylindrical sealing ring;

FIG. 40a is a side view of FIG. 40;

FIG. 41 is a front view of a sealing element comprising a metal ring with a concave jacket surface and O-ring seated thereon;

FIG. 42 is a front view of a sealing element comprising a metal ring with rectangular jacket surface and cylindrical metal sealing ring;

FIG. 47 is a front view of the mounting cylinder;

FIG. 48 is a sectional view along section A—A from FIG. 49;

FIG. 49 is a side view of the mounting cylinder;

FIG. 50 is an opposite side view of the mounting cylinder;

FIG. 51 is a front view of a straining ring;

FIG. 52 is a side view of the straining ring;

FIG. 53 is a front view of a conical ring;

FIG. 54 is a side view of the conical ring;

FIG. 55 is a front view of a sealing ring;

FIG. 56 is a side view of the sealing ring;

FIG. 57 is a front view of a ring nut; A

FIG. 58 is a side view of the ring nut;

FIG. 66 is a front view of a cut pipe section with preassembled clamping system;

FIG. 67 is a side view of a pipe joint with preassembled clamping system;

FIG. 68 is a front view of a section through a screwed-together pipe connection according to the present invention;

DESCRIPTION OF THE PREFERRED EMBODIMENT

Figure 11:
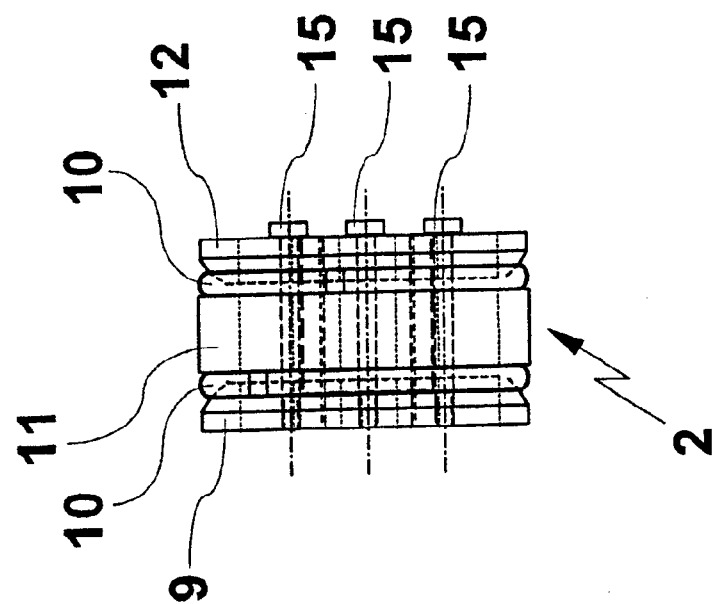
FIG. 11 is a side view of FIG. 9.
Figure 10:
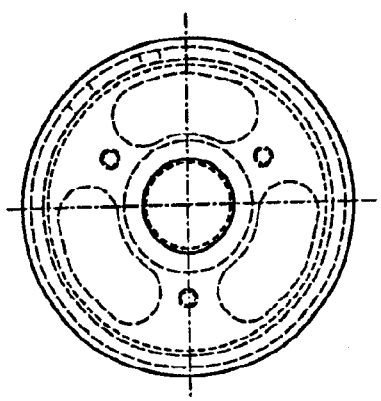
FIG. 10 is an opposite view of FIG. 9.
Figure 9:
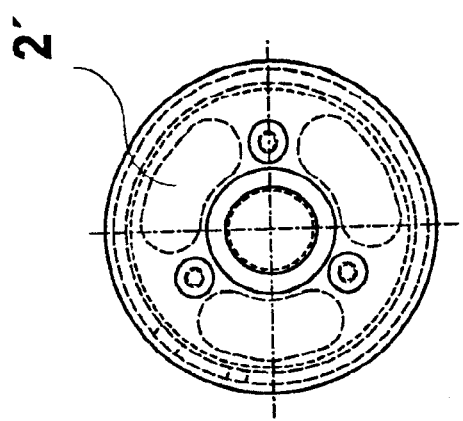
FIG. 9 is a front view of a mounted clamping system according to the invention.
Figure 9A:
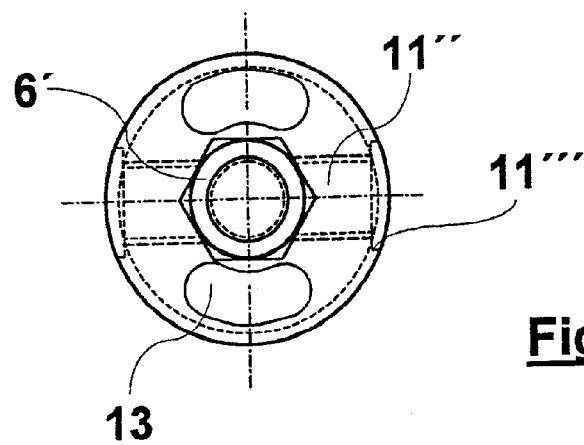
FIG. 9a is a front view of a second embodiment of a preassembled clamping system according to the invention.
Figure 43:
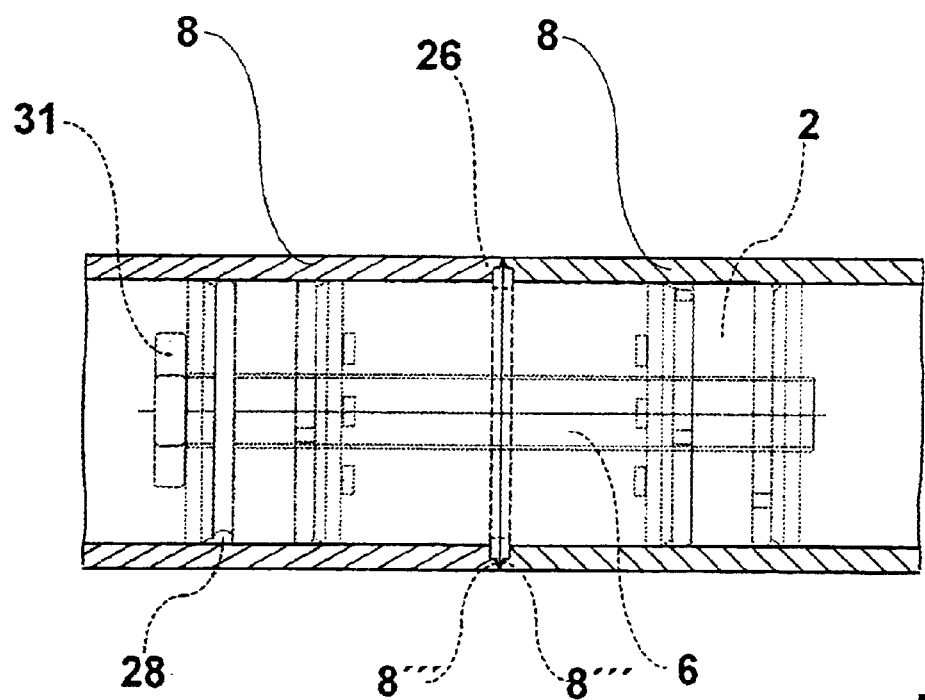
FIG. 43 is a front view of a straight pipe connection with a one-step chamfer and adjacent depression at the pipe ends and a cylindrical sealing ring.

The universal connection system 1 according to the present invention comprises, in a first exemplary embodiment, a clamping system 2 (see FIG. 11) with the individual parts belonging to it according to FIGS. 1, 2, 3, 4, 5, 6, 7 and 8. A mounting ring washer 9, a front ring washer 11 and an end ring washer 12 preferably have an external diameter of 35 mm. The mounting ring washer 9 and the end ring washer 12 have a thickness of, e.g., 5 mm, are flat on their outside. A chamfer of preferably 30° to 45° to the center of the washer is provided on the opposite surface on the circumference of the circle. In addition, the mounting ring washer 9 is provided in its center with a hollow cylinder 9' of a length of preferably 20 mm and an external diameter of 14 mm, which said cylinder is made in one piece with its chamfered surface at right angles to the chamfered surface and in which a through internal thread 9" of preferably metric thread size M 10 is provided as a right-handed thread. The front ring washer 11 preferably has a length of 8 mm and, moreover, like the end ring washer 12, it has an inner ring diameter of 14 mm. A straining ring 10, made preferably from round material of a diameter of 3 to 3.2 mm, with an external ring diameter of, e.g., 35 to 35.2 mm in the untensioned state and with an expansion angle of preferably 30° to 45°, the front ring washer 11, a second straining ring 10, and an end ring washer 12 are placed in this order on the hollow cylinder 9", the straining rings 10 being accommodated in the chamfers of the mounting ring washer 9 and of the end ring washer 12. In one embodiment variant, the mounting ring washer 9, the front ring washer 11 and the end ring washer 12 are preferably provided with three passage openings 13 each, which are arranged at equally spaced locations from one another, have uniform shape and size, are distributed over the ring surfaces, are preferably designed as elongated holes and extend axially, and they are provided with, e.g., three through holes 14 with a diameter of preferably 5.3 mm, which are offset preferably by 120° and are arranged between the passage openings 13, wherein the through holes 14 of the mounting ring washer 9 have an internal thread 14' of, e.g., M 5. According to FIG. 9, the parts assembled in the order indicated are detachably connected to the through holes 14 with the internal thread 14' of the mounting ring washer 9 according to FIG. 10, using the tightening screws 15 introduced from the end ring washer 12, using, e.g., machine screws preferably of the 4-mm Inbus design (hexagon socket screws) with an external thread of 5.3 mm as the said tightening screws, as a result of which the passage openings 13, which are not shown in FIG. 11 and in the other figures for the sake of clarity, will congruently lie one on top of another and form channels 2'. A clamping system 2 preassembled according to FIG. 11 is now inserted, with the tightening screws 15 pointing toward the front side, into a pipe section 8 having preferably an internal diameter of 36 mm and a wall thickness of 2 mm. The tightening screws 15 are tightened with a size 4 Allen wrench, as a result of which the straining rings 10 are pushed apart at an expansion angle of preferably 30° to 45° and are radially pressed against the inner wall of the pipe section 8. A threaded bolt 6, which acts as a straight connection between two pipe sections 8 equipped with clamping systems 2 in the above-described manner, can now be screwed continuously or on both sides into the internal thread 9" of the hollow cylinder 9' of the clamping system 2. Such an embodiment for a straight pipe connection, which is also shown as an end piece at the same time, is shown in FIG. 43, where the two pipe ends are provided with a chamfer 8" of preferably up to 10° and with an adjoining right-angled depression of a depth and width of 1 mm and are connected, sealed with a cylindrical ring washer 26 made preferably of an acid-resistant material. The chamfered pipe ends seal the pipe joint together with the cylindrical ring washer 26 so tightly that this form of the universal connection system 1 can be used for pipe systems which carry, e.g., liquid media, where the flow of the media is guaranteed through the channels 2' arranged in the clamping systems 2.

Rotation of screws 15 bring the end plates or ring washers 9 and 12 together. The threaded rod 6 acts as a clamp connector bringing the clamping Systems 2 together. Since the screws 15 can be rotated independently and separately from rotation of the clamp connector/threaded rod 6, the end plates 9 and 12 can be brought together and clamp into a pipe, independently and separately from the clamp connector bringing different clamping systems together.

Figure 11A:
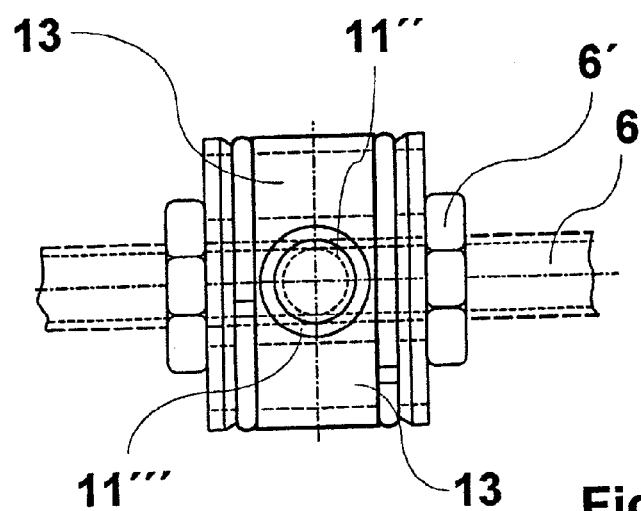
FIG. 11a is a side view of a clamping system according to the invention screwed together with a central threaded hole and nuts.
Figure 11B:
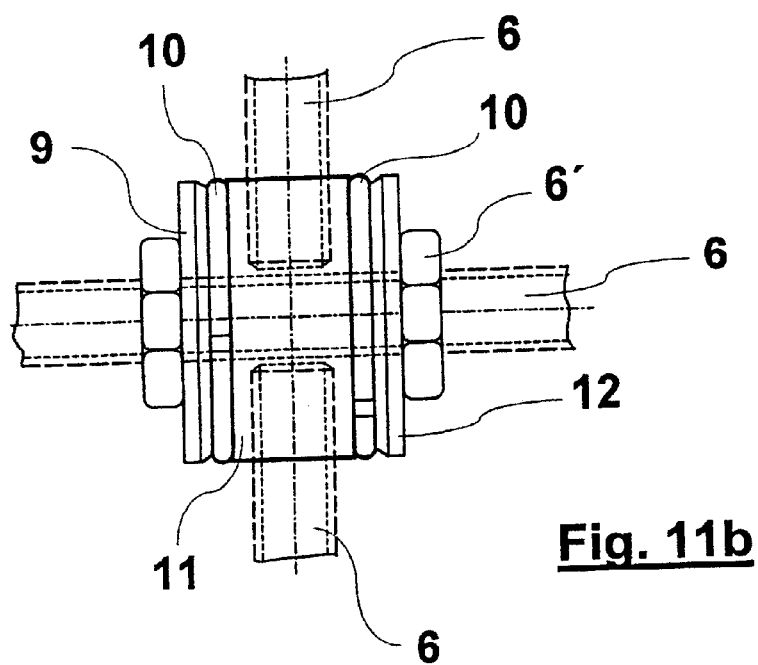
FIG. 11b is a side view of FIG. 11a with threaded bolts arranged crosswise.

A second embodiment of the universal connection system 1 is characterized by an embodiment of the clamping system 2 with a ring washer 11 according to FIG. 3a and FIG. 4a, where ring washer 11 has a preferred length of 20 mm and is provided with a radial threaded through hole 11" preferably of a size of M 10 with depressions 11''' in the jacket surfaces as well as with preferably two axial passage openings 13. A clamping system 2 mounted with this ring washer 11 in the above-described order is detachably connected to one another by a threaded bolt 6 extending centrally through the clamping system 2 and having an external thread of M 10, and with nuts 6' with an internal thread of M 10, which are screwed onto its two free ends. Threaded bolts 6 according to FIG. 11b can be screwed into the radial threaded through hole 11" on one side or on both sides, as a result of which a straight, T-shaped or crossed connection can be prepared with only one clamping system 2.

Figure 20:
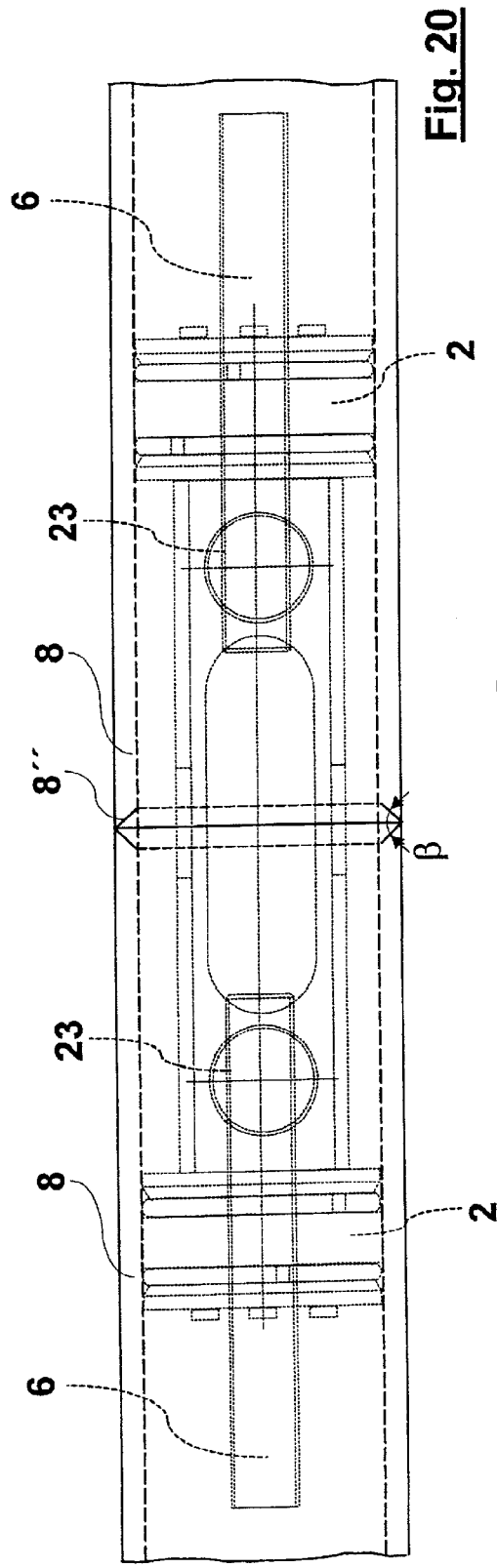
FIG. 20 is a view of a straight pipe connection with a straight connection element according to the invention.
Figure 21:
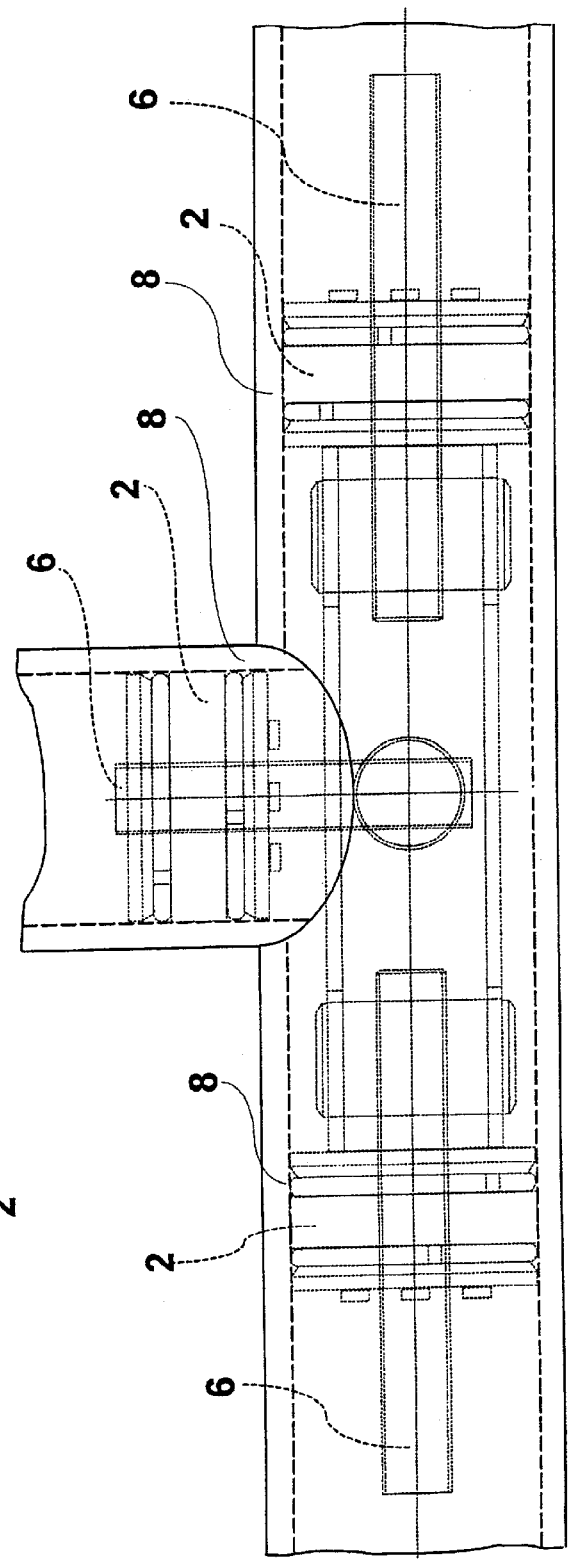
FIG. 21 is a view of a T-shaped pipe connection with a connection element according to the invention.
Figure 23:
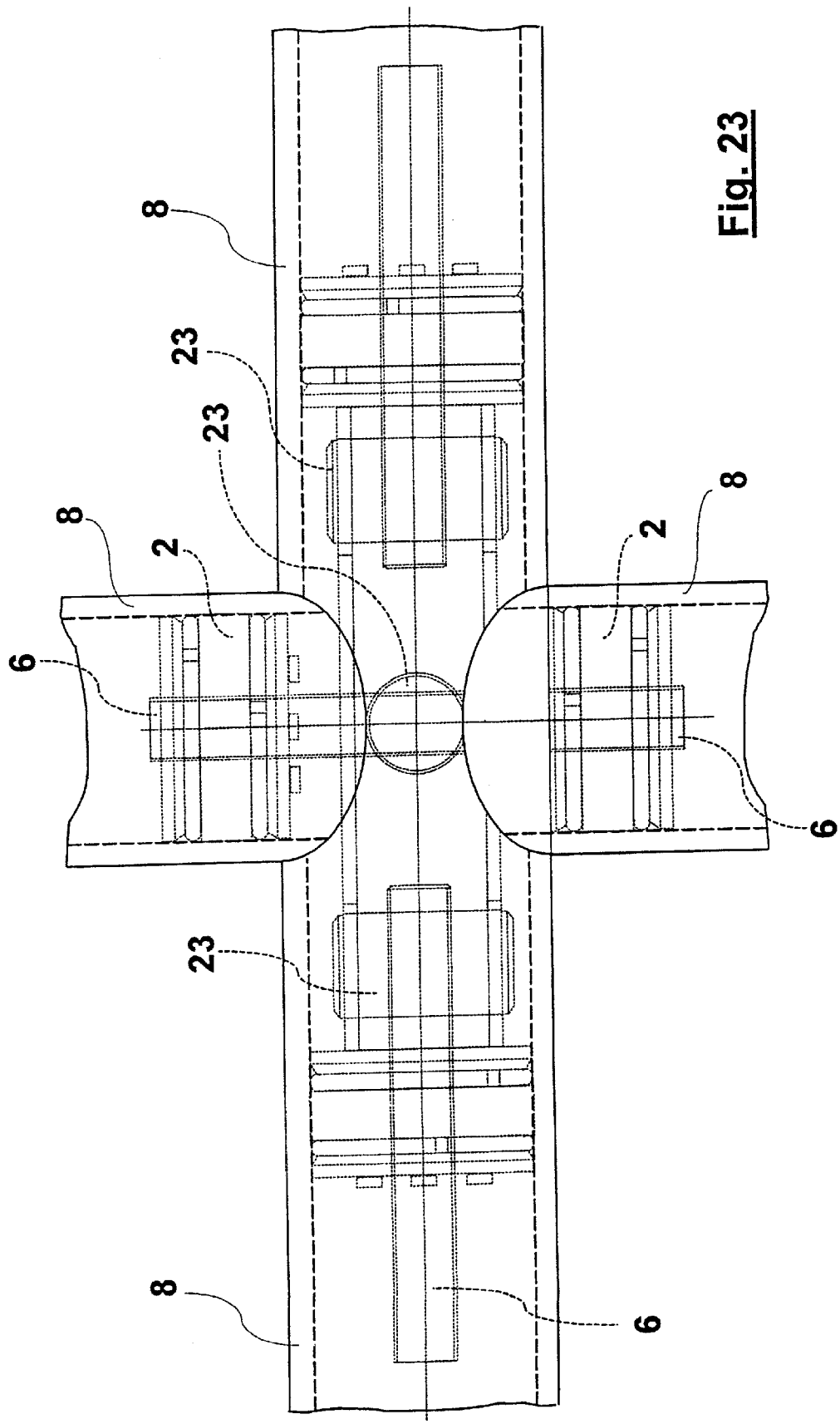
FIG. 23 is a view of a crossed pipe connection with a connection element according to the invention.

A third exemplary embodiment of the universal connection system 1 is characterized by the coupling of clamping systems 2 with a connection element 3 according to FIG. 12 through FIG. 14. A connection element 3 is made, e.g., of a square hollow section of a length of 98 mm with a respective side length of 25 mm and open and right-angled front sides. According to FIG. 14, mounting points 16" with a preferable diameter of 16.1 mm are arranged opposite each other in its surfaces. Opposite this, an elongated hole 16''' with a preferable width of 16.2 mm and a length of 50 mm is integrated between the end-side mounting points 16". In addition, the connection element 3 has two additional central mounting points 16", which are arranged opposite and crosswise to the end-side mounting points 16" and preferably have the same diameter as the end-side mounting points 16". If needed, hinge pins 23 according to FIG. 15, which preferably have a length of 32 mm, a diameter of 16 mm and a size M 10 central radial through threaded hole 23', can be inserted into the end-side and central mounting points 16" and be provided with threaded bolts 6. FIGS. 17 and 18 show two views of the outfitting of a connection element 3 with three hinge pins 23 and with threaded bolts 6 arranged therein, wherein the threaded bolt 6 arranged centrally is directed at right angles and clamping systems 2 are screwed onto the end-side threaded bolt 6. The two ends of the threaded bolt 6 arranged centrally are also provided with clamping systems 2 in FIG. 19 in order to show the versatility of the possible applications of this connection element 3. Various straight pipe connections according to FIG. 20, a T-shaped pipe connection according to FIG. 21 as well as according to FIG. 23a and a crossed pipe connection according to FIG. 23 can be mounted in a simple manner with this connection system preassembled according to different requirements.

Figure 22:
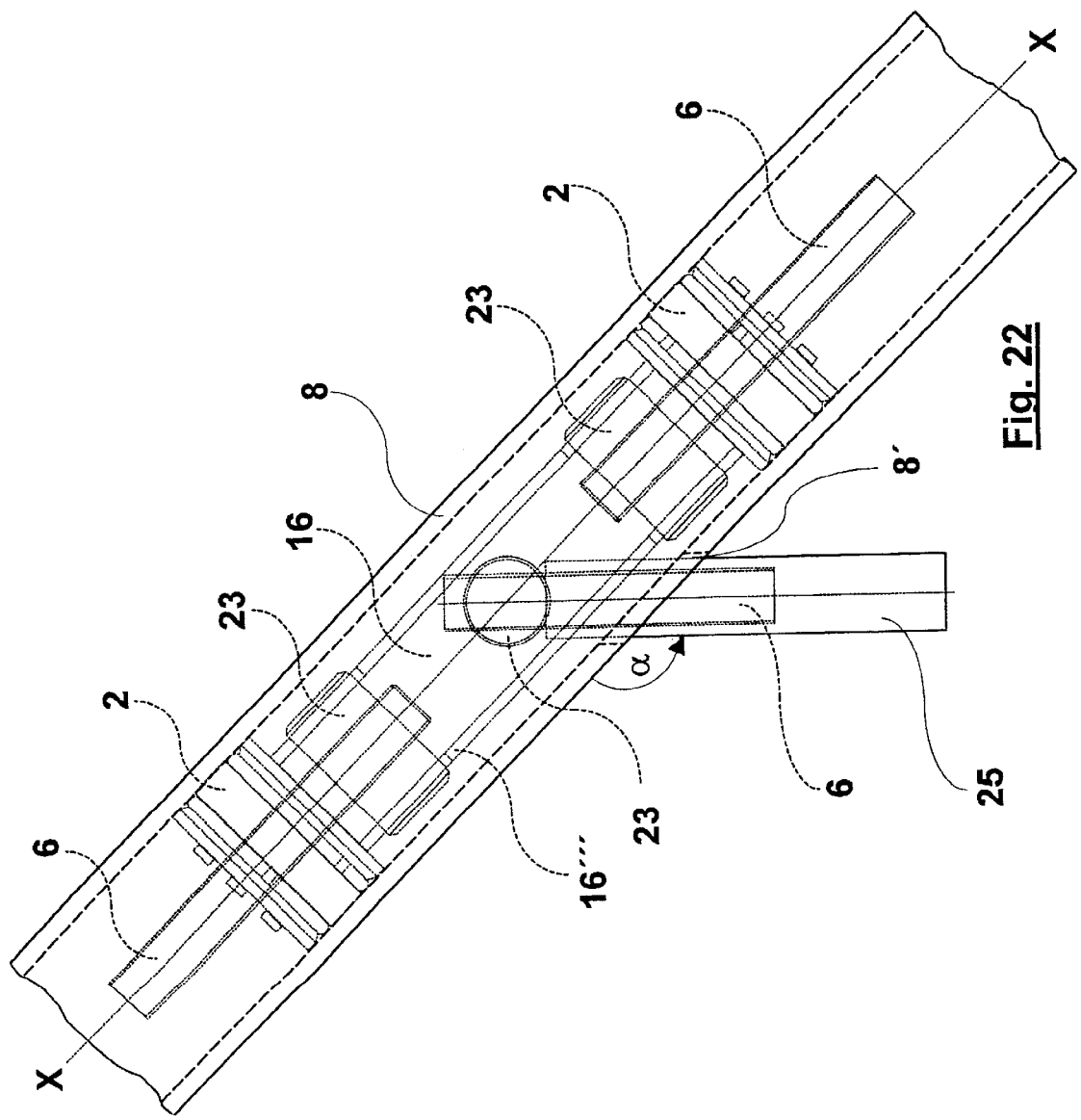
FIG. 22 is a view of a connection of a pipe which can be adjusted to an acute angle with a cylindrical section with a connection element according to the invention.
Figure 23B:
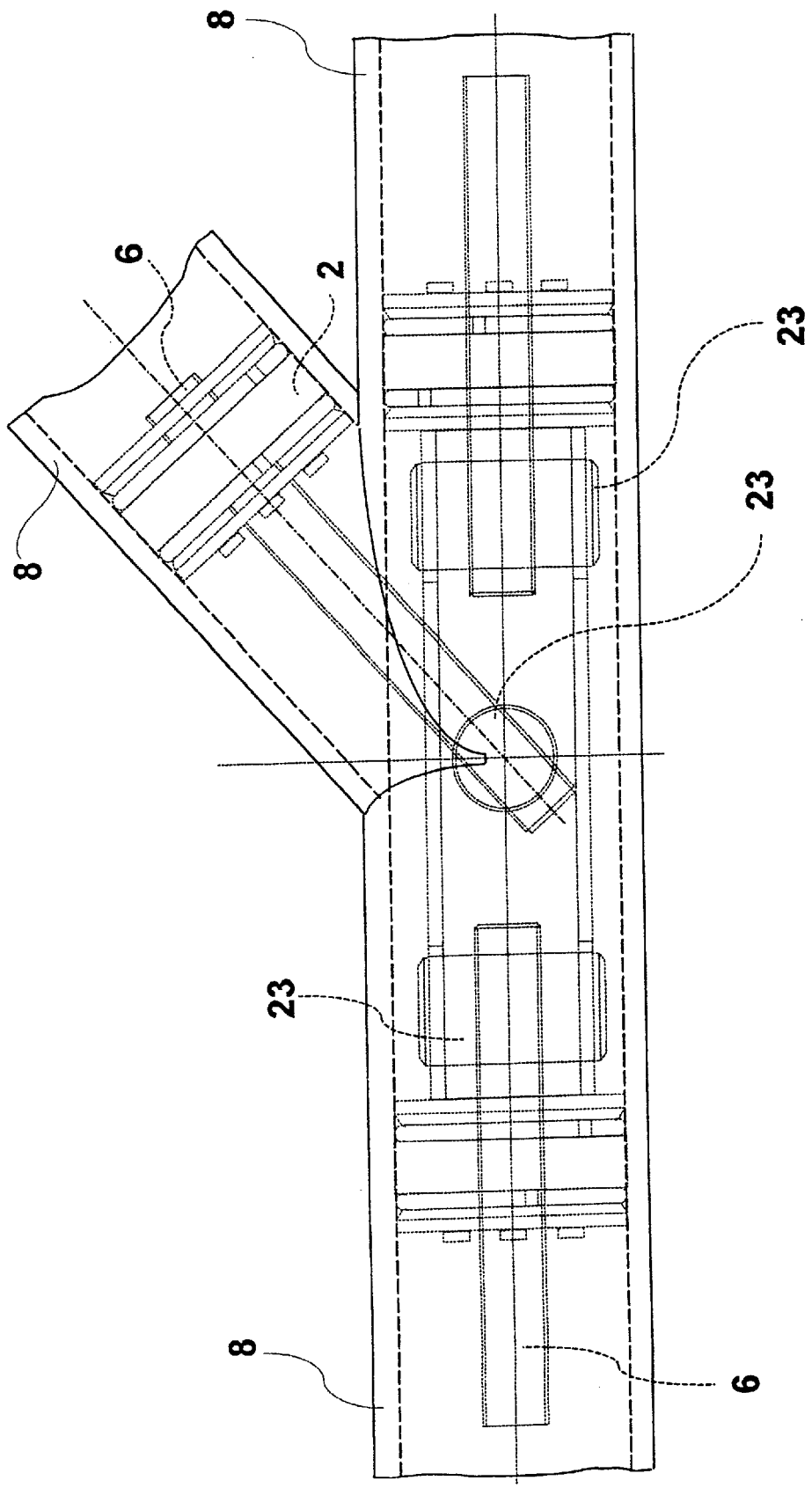
FIG. 23b is a view of an obtuse-angled pipe connection with a miter cut with a pipe end provided with different radii.

FIG. 22 shows an embodiment of a T-shaped connection with an acute or obtuse angle relative to the axis X of a pipe section, which said angle can be set as needed, with another element, e.g., with a solid section 25 here, where the connection element 3 preassembled with the central hinge pin 23 and the threaded bolts 6 arranged on the end side and with clamping systems 2 is introduced into a pipe section 8, which is provided with an oblique through hole 8' in its pipe jacket, which said oblique through hole is somewhat larger than the external diameter of the threaded bolt 6 and may also be elliptical in some cases. The preassembled connection system is pushed into the pipe section 8 until the central hinge pin 23 with its through threaded hole 23' reaches a congruent position with the through hole 8' of the pipe section 8. For example, the solid section 25 with an external thread preferably made in one piece with it can now be screwed directly into the through threaded hole 23" of the hinge pin 23 from the outside through the through hole 8'. With the solid section 25 screwed in, the central hinge pin 23 can now be pivoted around its axis W by any desired slope angle a in the range of 180° relative to the axis X of the connection element 3. With the pivoting of the solid section 25, the preassembled connection system is also displaced within the pipe section 8 along the axis X until the desired angular position is reached. The clamping systems 2 can now be braced with the Allen wrench in the pipe section 8 from the open front sides of the pipe section 8 and the solid section 25 can be screwed in, in a stable manner. A T-shaped pipe connection, not shown in detail in the drawings, can, of course, also be prepared by a pipe section 8 with straight cut being introduced into the pipe via an opening 8' prepared in an adapted manner in the pipe jacket of the other pipe section 8 and being able to be locked by means of the clamping systems 2. The same type of T-shaped pipe connection with acute or obtuse angle adjustable as needed in relation to the axis X with, e.g., a pipe section 8, which is provided with a miter cut with a radius made in one piece with it, is shown in FIG. 23b.

Figures 24, 24A:
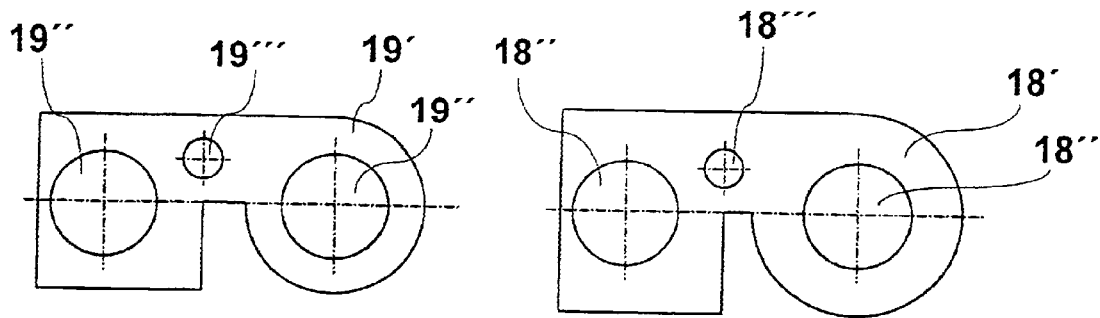
FIG. 24 is front view of a segment of a hinge leg of the radially pivotable connection element.
FIG. 24a is a front view of a segment of a second hinge leg of the radially pivotable connection element.
Figure 24B:
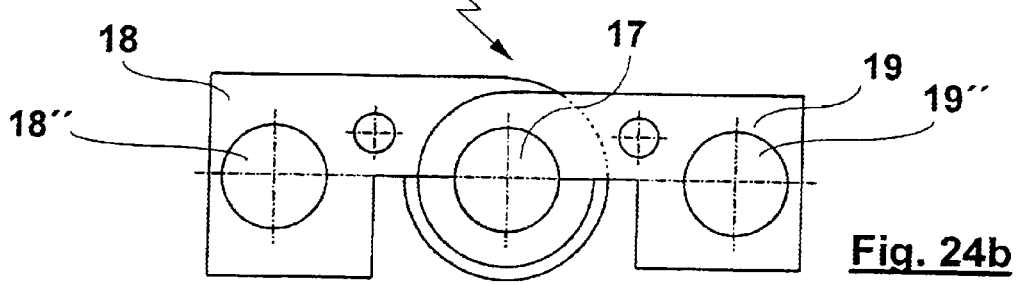
FIG. 24b is a front view of a mounted, radially pivotable connection element provided with a hinge pin in a linear view.
Figure 24C:
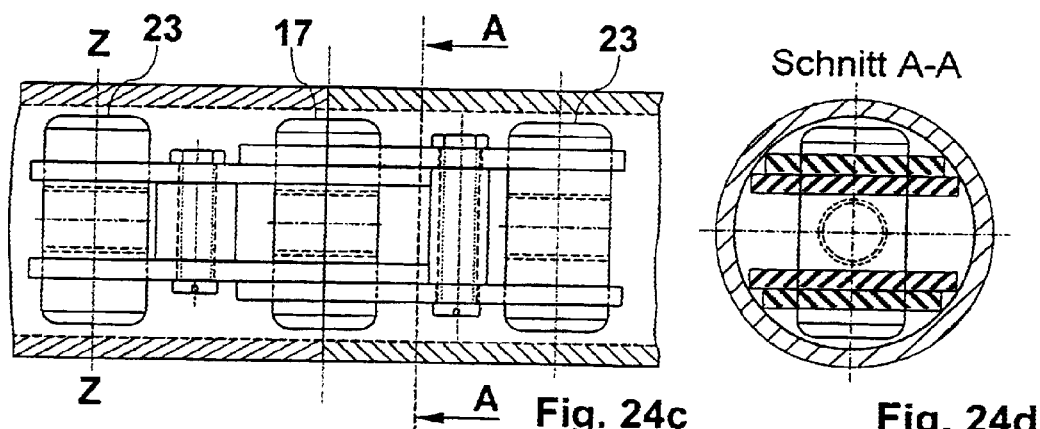
FIG. 24c is a top view of a detail of a mounted, radially pivotable connection element in a linear view in two pipe sections joined together.
Figure 24D:
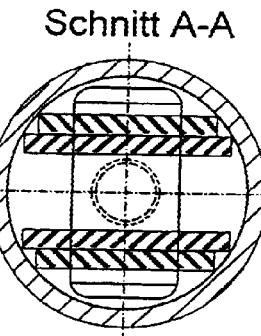
FIG. 24d is a view of a side view of section A—A from FIG. 24c.
Figure 24E:
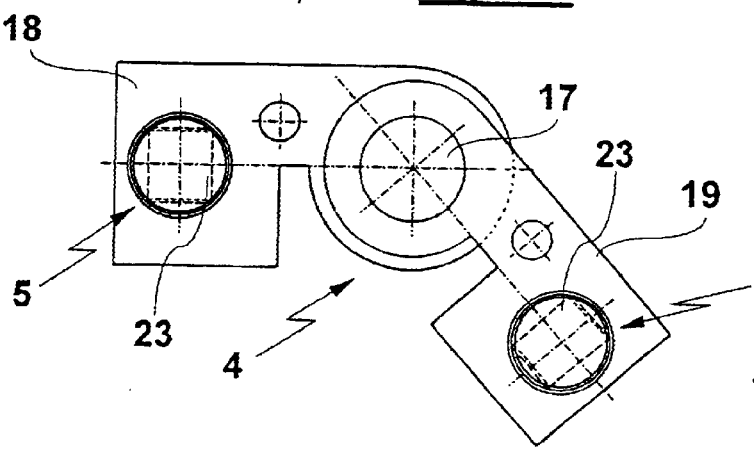
FIG. 24e is a front view of a mounted, rdially pivotable connection element provide with a hinge pin in an obtuse-angled view.

A fourth exemplary embodiment of the universal connection system 1 comprises a coupling of clamping systems 2 with a radially pivotable connection element 4, which is formed by two hinge legs 18 and 19, which are connected by a hinge pin 17 and are radially pivotable around a pin axis Z. The connection element 4 makes possible angular pipe connections in a range of preferably 179° to <45° in relation to the legs axes Y of the hinge legs. In a compact variant of the embodiment, the hinge legs 18 and 19 are formed by a segment 18' preferably having a length of 62 mm and a width of 31 mm and a segment 19' with a length of 60 mm and a width of 27 mm according to FIGS. 24 and 24a, which are designed on the one side preferably as closed rings notched on one side, and right-angled on the other side, wherein the front side of the segment 18' designed as a closed ring notched on one side preferably has a radius of 15.5 mm and that of the segment 19' has a smaller radius of 13.5 mm. Mounting points 18" or 19" with a diameter of preferably 16 mm are integrated on the segments 18' and 19' on the end sides and a through hole 18'41 and 19''' with a diameter of preferably 6 mm is arranged approximately in the center. Two segments 18' and two segments 19' each are connected to one another by means of a spacer segment 20 each and a prior-art screw connection, located opposite each other, such that the mounting points 18" and 19" and the rounded front sides of the segments 18' and 19' are located congruently opposite each other, as a result of which permeable legs 18 and 19 are formed. The mounting points 18" and 19" on the front sides of the hinge legs 18 and 19, which front sides are rounded of as a closed ring notched on one side, are connected to one another by a hinge pin 17, which has a diameter of 18 mm and is preferably arranged with snug fit, and they are radially pivotable around the pin axis Z. FIG. 24b shows a front view of the preassembled connection element 4 described without a hinge pin. FIG. 24c shows a top view of a connection element 4 with the hinge pin 23 in a connection of two pipe sections 8, and FIG. 24d shows a section A—A through the pipe connection in FIG. 24c. The sectional view shows very clearly how the segments 18' and 19' of the hinge legs 18 and 19 lie in the pipe section 8 and that in addition to the radial clamping by means of the clamping systems 2, which are not shown in detail, they guarantee the locking of the radially pivotable connection element 4 within the pipe sections 8. FIG. 24e shows an arrangement of the connection element 4 without tie-in points 5 at an obtuse angle to the leg axis Y of the hinge leg, with which exactly the same pipe connection can be prepared by means of coupled clamping systems 2. This radially pivotable connection element 4 represents a compact design.

FIGS. 25 through 28 show a second embodiment of a radially pivotable connection element 4 with extended leg design, which is formed by a one-part hinge leg 21 and a two-part hinge leg 22, which are connected to one another by a hinge pin 17 and are radially pivotable around the pin axis Z. The hinge leg 21 is formed by two segments 21' of a length of preferably 120 mm and a width of 27 mm according to FIG. 25, which are rounded on one front side and are rectangular on the opposite front side. In addition, a mounting point 21" is integrated on each end side on each segment 21' and two through holes 21''' with a diameter of preferably 6 mm are arranged approximately in the center. The hinge leg 22 is formed by two first segments 22' of a length of preferably 81 mm and a width of 27 mm according to FIG. 26 and two second segments 22''' of a length of preferably 71 mm and a width of 27 mm. The first segments 22' are provided at one end with a mounting point 22" with a diameter of preferably 18 mm on the rounded front sides and preferably 16 mm on the rectangularly designed front sides and with two through holes 22''' with a diameter of preferably 6 mm at the opposite end. One segment 22' and one segment 22''' each are connected to one another by means of through holes 22''' and prior-art screw connections. Two segments 21' and two preassembled segments 22' with 22''' are connected to one another, located opposite, by means of preferably two spacer segments 20 each, such that the mounting points 21' and the mounting points 22" and the rounded front sides of the segments are located congruently opposite each other, as a result of which the legs 21 and 22 are formed. The mounting points 21" and 22" on the rounded front sides of the hinge legs 21 and 22 are connected to one another by a hinge pin 17, which is arranged with snug fit and has a diameter of preferably 18 mm and are radially pivotable around the pin axis Z.

Figure 32:
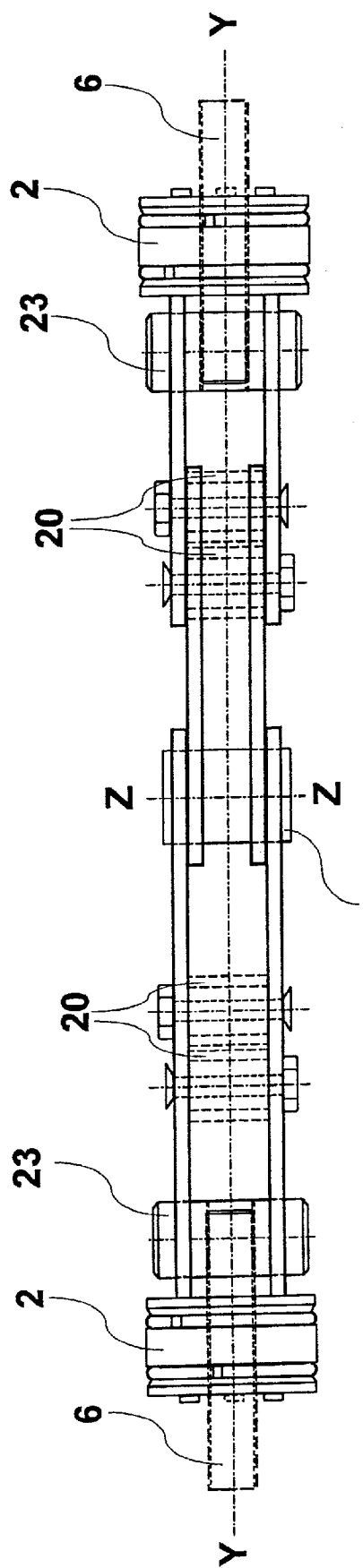
FIG. 32 is a top view of FIG. 29 with clamping systems arranged by means of threaded bolts.
Figure 33:
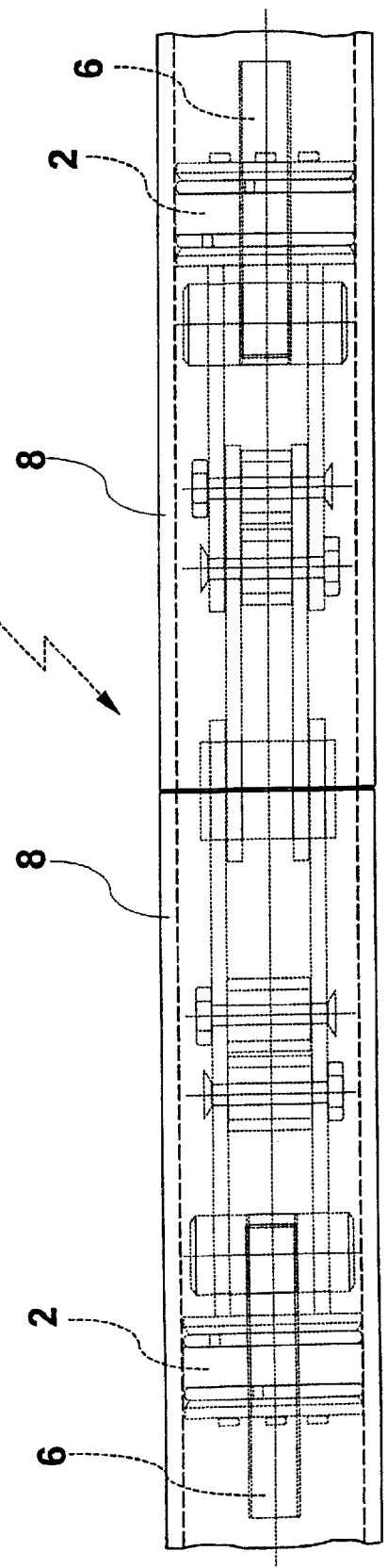
FIG. 33 is a top view of an angular pipe connection.
Figure 34:
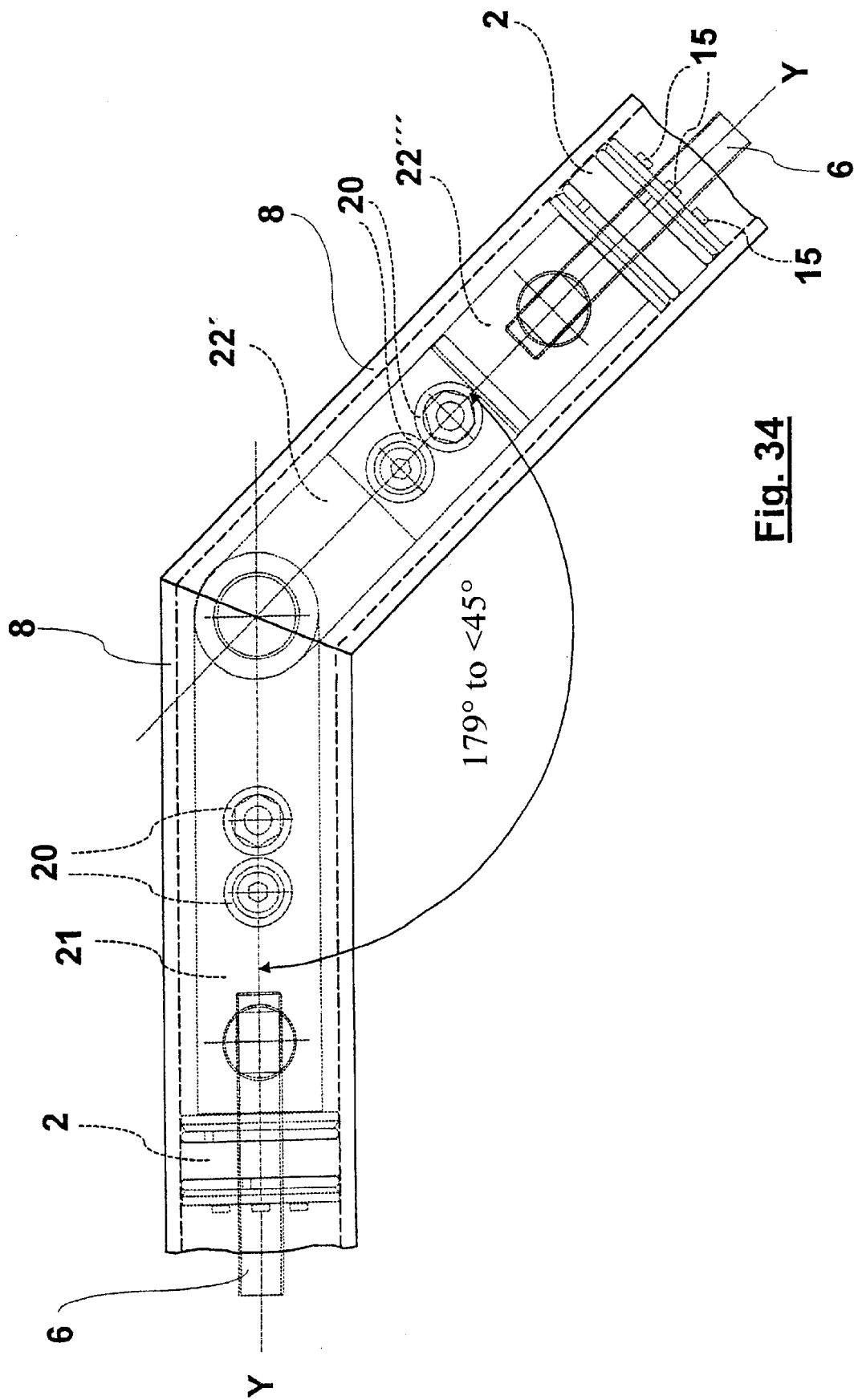
FIG. 34 is a front view of an angular pipe connection in an obtuse-angled representation.

A connection element 4 thus preassembled is shown in greater detail in FIGS. 29 through 31, where FIG. 29 shows a front view of a connection element 4 with divided spacer segments 20 and FIG. 30 shows same with a spacer segment 20 made in one piece. FIG. 31 shows a top view of the preassembled connection element 4 according to FIG. 29, which is equipped on the end side with a hinge pin 23, which can, in turn, be connected to a clamping system 2 by means of threaded bolts 6, as is shown in FIG. 32. A pipe section with at least one pipe end provided with a miter cut is now placed on one hinge leg 21 thus preassembled and the clamping system 2 is screwed down on the front side. According to FIG. 33, a second pipe section 8, likewise provided with a miter cut of the same angle, is then placed on the hinge leg 22, the hinge leg 22 with the pipe sections 8 is pivoted around the pin axis Z until the miter cuts of the pipe sections 8 come into contact with one another, e.g., as in FIG. 34, and the second clamping system 2 is screwed on, on the front side. Each pipe connection can thus be prepared in the angle range mentioned in the introduction. The same assembly procedure is intended for the compact design of the hinge legs 18 and 19.

Figure 35:
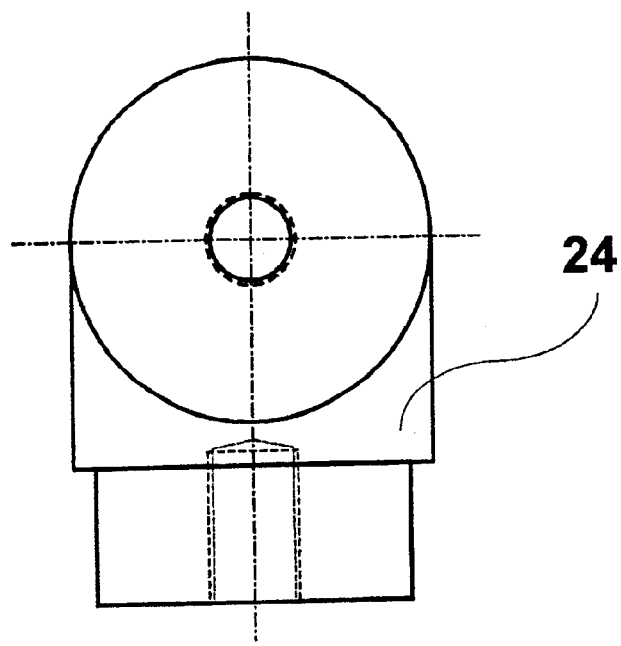
FIG. 35 is a front view of a elbow with central threaded hole.
Figure 36:
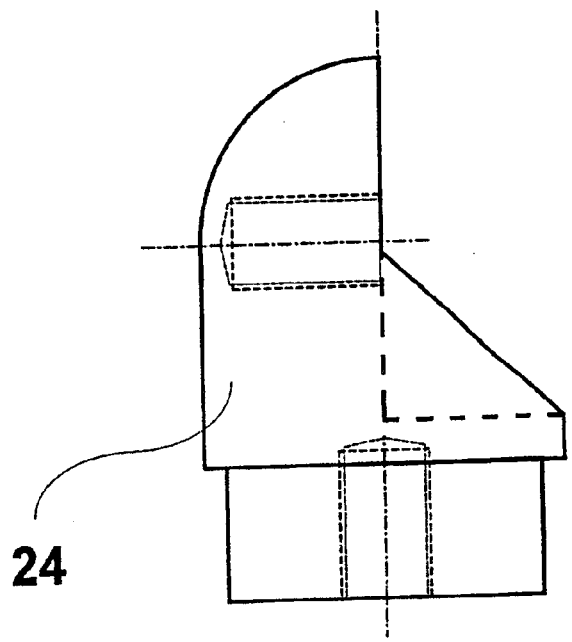
FIG. 36 is a side view of FIG. 35.

A fifth exemplary embodiment according to FIGS. 37 through 39 shows a pipe connection with a massive elbow 25 according to FIGS. 35 and 36. A straight-cut pipe section 8 is preassembled here with a clamping system 2 and a threaded bolt 6 and screwed by means of the threaded bolt 6 into a hole of an elbow 24 with an integrated stop at an angle of 90° according to FIG. 37, at an angle of 45° according to FIG. 38 and at an angle of 120° according to FIG. 39. This screw connection can, of course, also be prepared with other elements 7 such as pipe bends or plates. FIG. 37 shows, in addition, an embodiment of the pipe connection in which the elbow 24 has a passage opening 13, which forms a channel 2' through the elbow 24 and in which the obtuse connection points are sealed with an O-ring 28.

An embodiment not shown in detail in the drawings represents a connection between a pipe section 8 equipped with a clamping system 2 and a threaded bolt 6, in which a left-hand thread is provided only in the hollow cylinder 9' of the clamping system 2, as a result of which a prior-art turnbuckle is connected by the threaded bolt 6 to the universal connection system 1 and can be used to brace the pipe system or other systems. This connection can also be used for pipe connections which carry gaseous or liquid media.

FIGS. 40 through 42 show various embodiments of sealing elements O. Thus, FIGS. 40 and 40*a* show a cylindrical sealing ring 26. FIG. 41 shows a metal ring 27 with concave jacket surface 27' and an O-ring 28 seated thereon, and FIG. 42 shows a metal ring 27 with a rectangular jacket surface 27' and a cylindrical metal ring 29 seated thereon.

FIGS. 43 through 46 show pipe connections with the respective last pipe section 8 of a pipe connection which carries liquid or gaseous media, where the respective last clamping system 2 has, instead of a straining ring 10, a sealing element O, the pipe connection point is sealed with sealing elements O according to FIGS. 40 through 42, and pipe ends are chamfered differently, and the connection of the clamping systems 2 is established with a machine screw 31 instead of with a threaded bolt 6.

Figure 44:
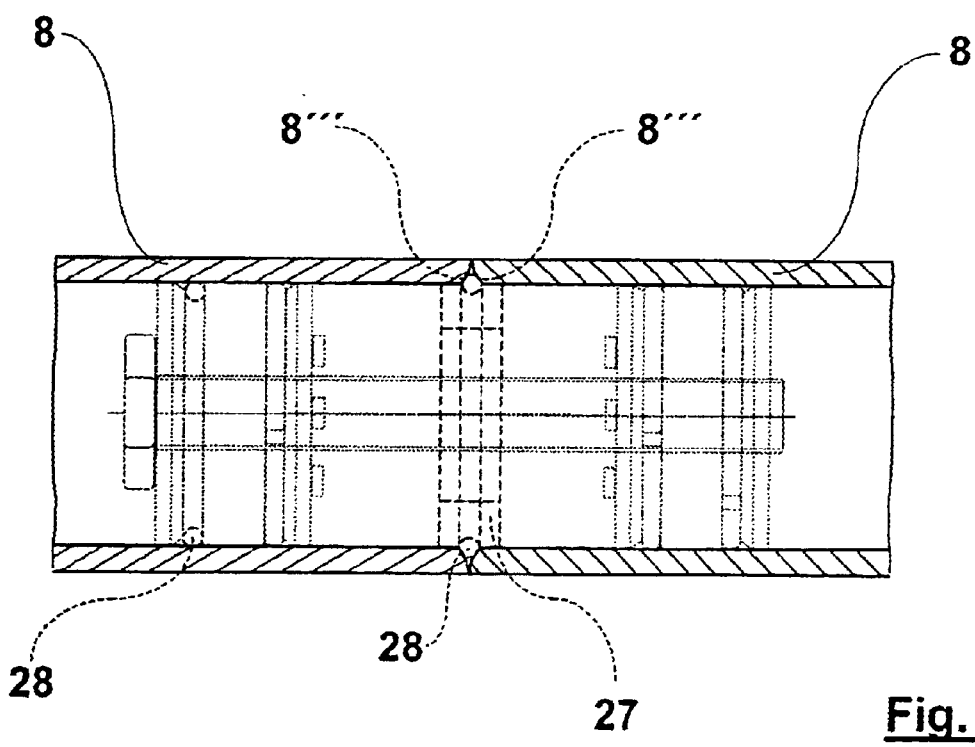
FIG. 44 is a front view of a straight pipe connection with pipe ends with two-step chamfer and a metal ring with concave jacket surface and O-ring seated thereon as the sealing element.

Thus, FIG. 43 shows the sealed connection of two pipe sections 8, whose pipe ends are provided with a chamfer, which extends toward the center of the pipe and preferably has a width of 1 mm and an angle â of 10°, and with an adjoining, right-angled depression with a width of 1 mm, in which a cylindrical sealing ring 26 according to FIGS. 40 and 40*a* with an external diameter of preferably 37 mm, an internal diameter of 27 mm and a thickness of 2 mm is seated, which seals the connection point of the two pipe sections 8. FIG. 44 shows a sealed connection of two pipe sections 8, whose pipe ends are provided with a two-step chamfer extending toward the inside of the pipe, whose first step from the pipe jacket has a width of preferably 1 mm and a chamfer angle of 10° and whose second step has a width of preferably 1 mm and a chamfer angle of 30° and in the second chamfer step of which a metal ring 27 with concave jacket surface 27' and with an O-ring 28 located therein are seated, wherein the metal ring has an external diameter of preferably 35.7 mm and a width of 12 mm and its jacket surface is provided with a concave groove with a width of preferably 4.1 mm and a depth of 2 mm, in which a standardized O-ring 28 according to FIG. 41, whose size corresponds to that of the groove, is mounted.

Figure 45:
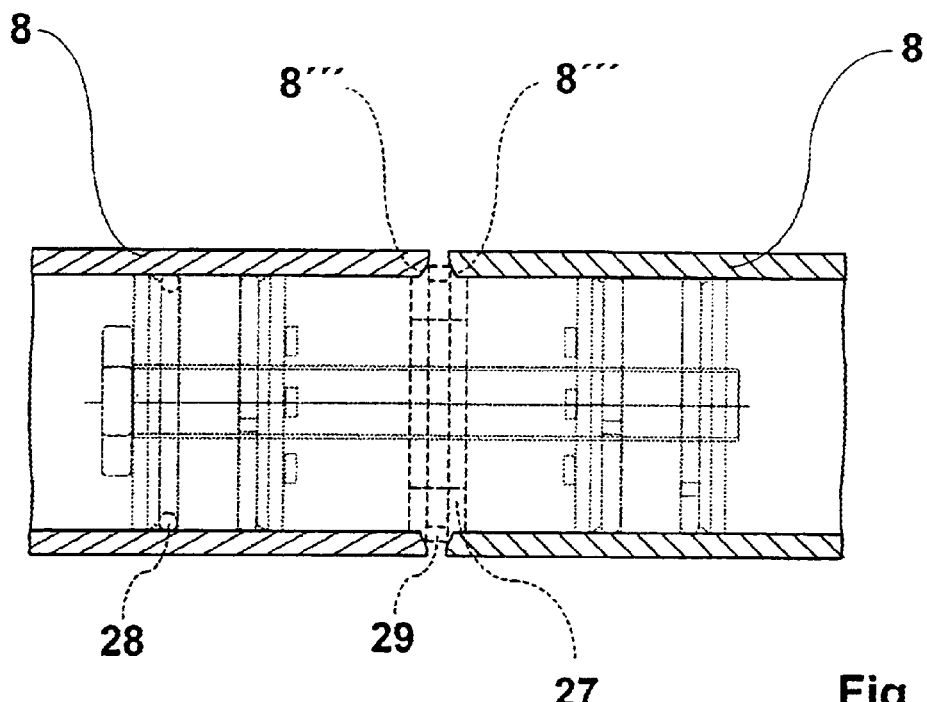
FIG. 45 is a front view of a straight pipe connection with pipe ends with two-step chamfer and a metal ring with rectangularly integrated jacket surface and a cylindrical ring seated thereon as the sealing element.
Figure 46:
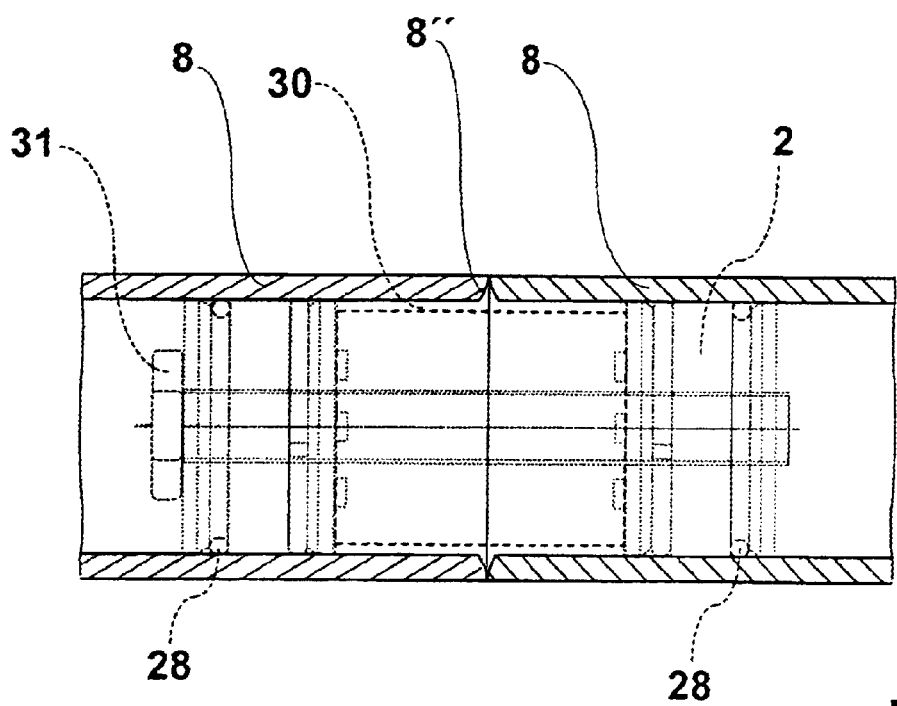
FIG. 46 is a front view of a straight pipe connection with pipe ends with two-step chamfer and a cylindrical sealing sleeve as the sealing element.

FIG. 45 shows a connection of two pipe sections 8, which connection is sealed according to FIG. 41, where the pipe ends of the said pipe sections are provided, with a two-step chamfer extending toward the inside of the pipe, where a cylindrical metal ring 27 with a rectangular groove is used as the sealing element O, in which groove, e.g., a cylindrical metal ring 29 according to FIG. 42 is mounted. The connection point is shown in the state in which it is not yet screwed together firmly because the cylindrical metal ring 29 adapts itself to the two-step chamfer of the pipe ends during the connection of the clamping pieces 2 with the machine screw 31. Finally, FIG. 46 shows another sealed pipe connection variant with a cylindrical sealing sleeve 30 of an external diameter of preferably 36.1 mm and a wall thickness of 1.5 mm, which is introduced into the pipe ends.

Figures 59, 60, 61:
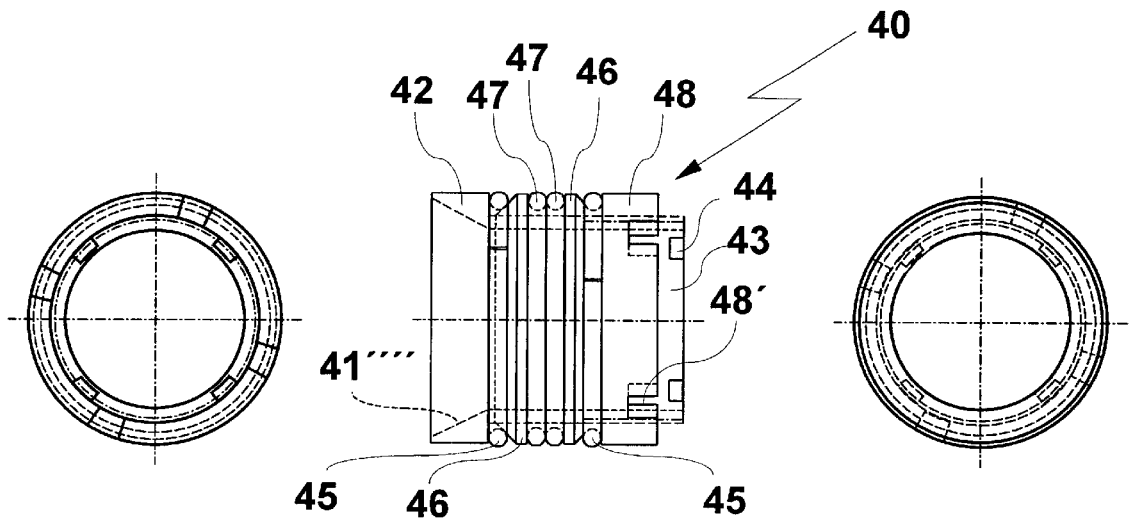
FIG. 59 is a front view of an unbraced clamping system.
FIG. 60 is a side view of the unbraced clamping system.
FIG. 61 is an opposite side view of the unbraced clamping system.
Figures 62, 63:
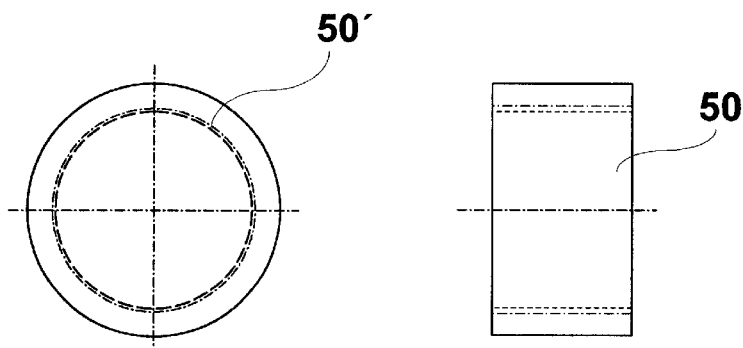
FIG. 62 is a front view of an inner connecting sleeve.
FIG. 63 is a side view of the inner connecting sleeve.
Figures 64, 65:
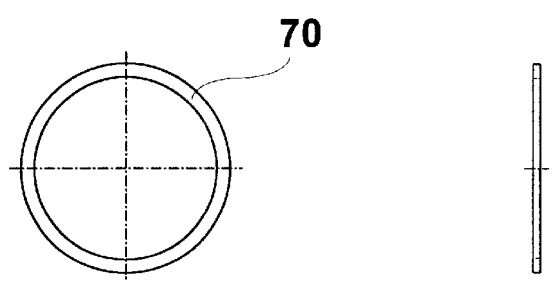
FIG. 64 is a front view of a sheet gasket.
FIG. 65 is a side view of a sheet gasket.
Figure 69:
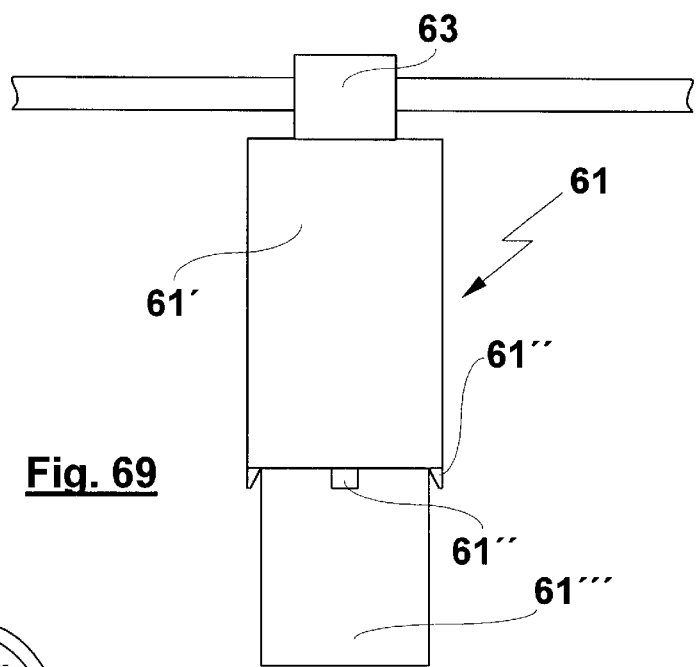
FIG. 69 is a side view of the inner ring socket wrench.
Figure 70:
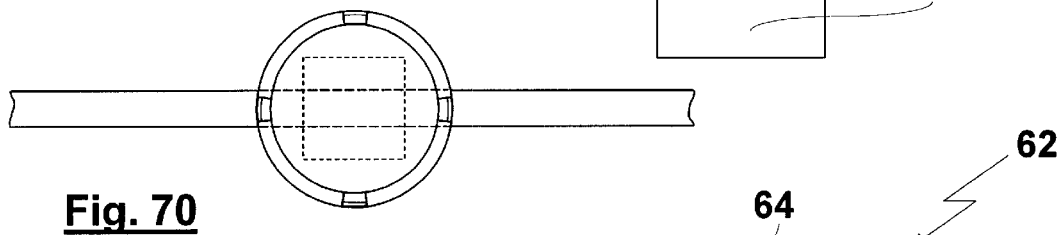
FIG. 70 is a top view of the inner ring socket wrench.
Figure 71:
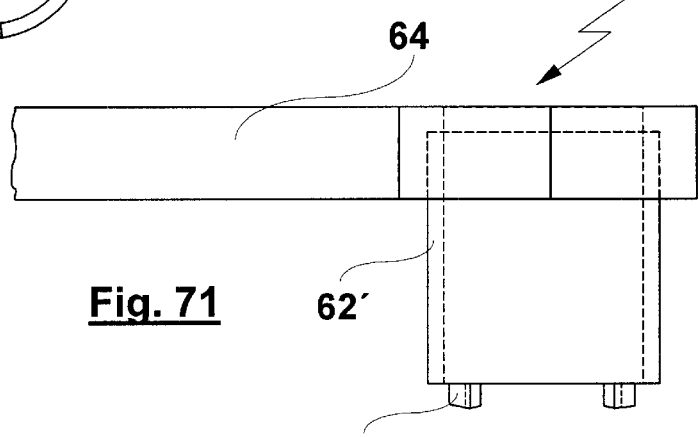
FIG. 71 is a side view of the outer ring socket wrench.
Figure 72:
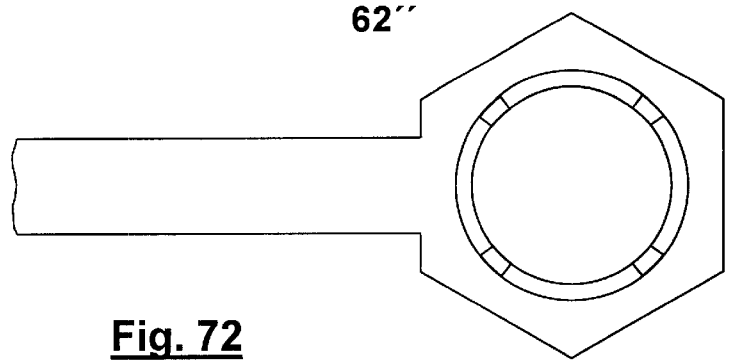
FIG. 72 is a top view of th e outer ring socket wrench.
Figure 73:
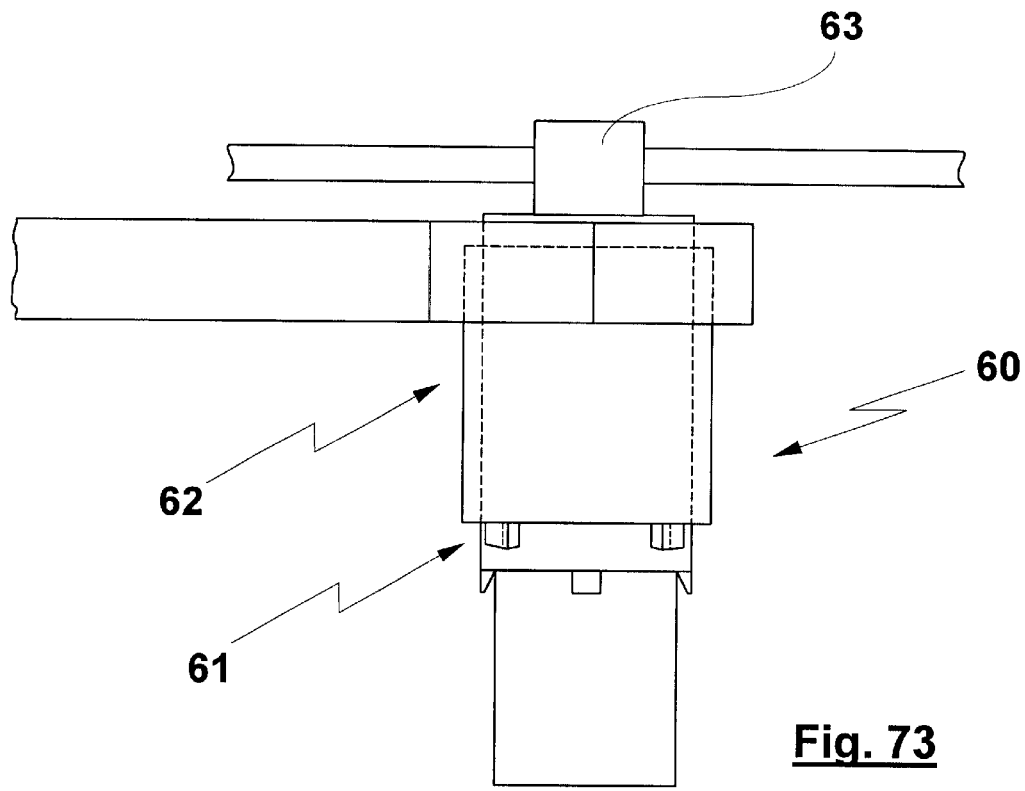
FIG. 73 a side view of the completed locknut wrench.
Figure 74:
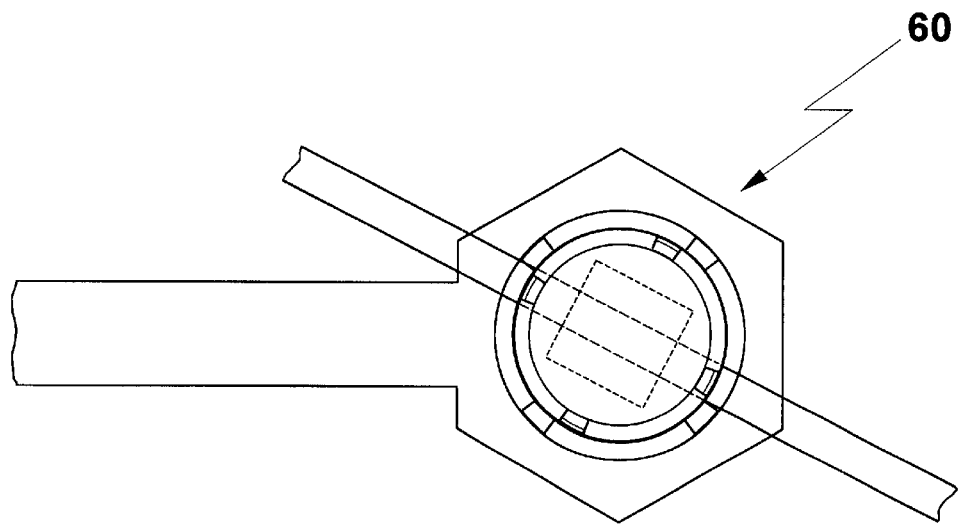
FIG. 74 is a top view of the completed locknut wrench.

FIGS. 47 through 58 show the individual parts of a clamping system 40 of the universal connection system I according to the present invention, which is intended especially for pipe connections suitable for liquid and gaseous media as well as for ducting cables. A mounting cylinder 41 according to FIGS. 47 through 50, which has a length of preferably 38 mm and an internal diameter of 25 mm, was used in this clamping system, and a collar 42 with a diameter of 35.5 mm and a length of 8 mm, whose inner surface has a chamfer 41''' extending concavely to the end, is made radially in one piece with one end 41'' of the said mounting cylinder, and an external thread of the size of M 30×1.5 is arranged over a length of 20 mm at the opposite end 41''' of the said mounting cylinder, and preferably four chamfer segments 44 having preferably a length of 3 mm, a width of 4 mm, a depth of 2 mm and a chamfer angle of 60° are made in one piece with the free end of the said external thread. The inner area of the collar 42 may also be provided with a threaded hole of, e.g., M 10×1.5 land with passage openings 13 of an optimal size arranged radially around the said threaded hole, as a result of which this clamping system 40 is suitable not only for straight pipe connections but also for pipe connections extending differently. At any rate, a standardized straining ring 45 according to FIG. 51 and FIG. 52, made preferably of steel, a conical ring 46 according to FIGS. 53 and 54 with a chamfer toward the straining ring 45, which preferably has a width of 4 mm, an external diameter of 35.5 mm and an internal diameter of 30.8 mm and is provided with an outer chamfer of a width of 2 mm and a chamfer angle of 60°, are placed in this order on the mounting cylinder 41 from the side of the external thread 43. This is preferably followed by two sealing rings 47 according to FIGS. 55 and 56 made of copper, e.g., according to DIN 7603 of a nominal size of 30×38 and with a height of 2.5 mm, and another conical ring 46 of the above-described size with its chamfer toward a second straining ring 45 of the above-described size. Finally, a ring nut 48 according to FIGS. 57 and 58 with a preferable width of 6 mm, an external diameter of 35.5 mm and an internal thread of M 30×1.5 as well as preferably four rectangular recesses 48' of a width of 5 mm and a length of 3 mm, which are integrated on the front side, with which the clamping system 40 according to FIGS. 59 through 61 is preassembled, are screwed onto the external thread 43 of the mounting cylinder 41. By slightly tightening the ring nut 48, the straining rings 45 are pressed by the conical surface of the conical rings 46 and the sealing rings 47 slightly beyond the external diameter of the collar 42 and of the ring nut 48. In this state, the clamping system 40 is first inserted with the collar 42 into the open end of a pipe section 8 according to FIGS. 66 and 67 until it forms one plane with the pipe joint. The locknut wrench 60 according to FIGS. 69 through 74 is now introduced on the front side into the pipe end equipped with the clamping system 40 such that the inner ring socket wrench 61 with its segment lugs 61'' snaps into the chamfer segments 44 of the mounting cylinder 41 and the rectangular lugs 62'' of the outer ring socket wrench engage the rectangular recesses 48' of the ring nut 48. The outer ring socket wrench 62 is rotated with the grips 63 and 64 against the inner ring socket wrench 61 around a common axis and the clamping system 40 is locked in a stable manner and is radially sealed toward the inner wall of the pipe. The clamping systems 40 are pressed together during locking in the pipe sections 8 between 2 to 2.5 mm, which requires a certain compensation of the clearance at the pipe connection points. A second pipe section 8 is then preassembled in the above-described manner. An inner connecting sleeve 50 according to FIGS. 62 and 63 with an external diameter of preferably 35.5 mm, an internal thread of M 30×1.5 and a width of 13 mm is now screwed onto the free piece of the external thread 43 of one clamping system 40 into the end of one pipe section 8, a seal 70 according to FIGS. 64 and 65, e.g., a ring seal with an external diameter of 38 mm, an internal diameter of 35.5 mm and a thickness of 1 mm, made of Gylon 3501 E, which is especially compatible with foods, is inserted into the inner connecting sleeve 50, and the second pipe section 8 equipped with a clamping system 40 with the external thread 43 of the mounting cylinder 41 is now screwed into the inner connecting sleeve 50 until the two dull pipe ends and the front surfaces 41' firmly press the seal 70. The seal 70 is compressed during this screwing operation such that it guarantees the axial sealing and a seamless transition within the universal connection system 1. For additional safety, e.g., in the case of gaseous media, an additional sealing may be performed during the screwing operation between the external thread 43 of the mounting cylinder 41 and the internal thread 51' of the inner connecting sleeve 50 by means of teflon tape, hemp or adhesive. The seal 70 has, moreover, the function of compensating the clearance that is necessary during the screwing together of the pipe ends in the inner connecting sleeve 50 by the pressing together of the clamping systems 40. Al parts of the embodiments of the universal connection system 1 can be combined, in principle, with one another and can be adapted to individual application conditions by making slight changes in the dimensions and replacing individual technical features.

While specific embodiments of the invention have been shown and described in detail to illustrate the application of the principles of the invention, it will be understood that the invention may be embodied otherwise without departing from such principles.

What is claimed is:

1. A connection system for a plurality of pipes, the system comprising:

a first clamp insertable inside a first pipe of the plurality of pipes and radially holdable of the first pipe, said first clamp having a first clamp ring arranged between two end plates, said first clamp also having a first clamp fastener for bringing respective said end plates together and radially expanding said first clamp ring to contact an inside of the first pipe and to hold the first pipe;

a second clamp insertable inside a second pipe of the plurality of pipes and radially holdable of the second pipe, said second clamp having a second clamp ring arranged between two end plates, said second clamp also having a second clamp fastener for bringing respective said end plates together and radially expanding said second clamp ring to contact an inside of the second pipe and to hold the second pipe, a clamp connector insertable into the first and second pipes, said clamp connector being connectable to said first and second clamps, said clamp connector having connector structure to bring said first and second clamps together with said clamp connector and said first and second clamps arranged completely inside the first and second pipes, said first and second clamp fasteners bringing respective said end plates together independently and separately from said clamp connector bringing said first and second clamps together.

2. A system in accordance with claim 1, wherein:

said clamp connector includes a threaded rod threadable into said first and second clamps.

3. A system in accordance with claim 1, wherein:

said clamp connector holds the first pipe angularly spaced from said second pipe.

4. A system in accordance with claim 3, wherein:

said clamp connector selectively holds the first pipe at a plurality of angularly spaced positions from said second pipe.

5. A system in accordance with claim 4, wherein:

said clamp connector includes a hinge pin pivotally connecting two parts of said clamp connector.

6. A system in accordance with claim 1, further comprising:

a third clamp insertable inside a third pipe of the plurality of pipes and radially holdable of the third pipe;

said clamp connector being also insertable into the third pipe and being connectable to said third clamp, said connector structure of said clamp connector bringing said first, second and third clamps together with said clamp connector and said first, second and third clamps arranged completely inside the first, second and third pipes.

7. A system in accordance with claim 6, wherein:

said clamp connector includes first, second and third rods and a connection element, said rods pivotally connect the respective first, second and third pipes to said connection element; said clamp connector includes first, second and third binge pins pivotally mounted in said connection element, said rods are threaded into respective said clamps and said hinge pins.

8. A system in accordance with claim 1, wherein:

said first and second clamp fasteners each include a threaded rod engaging with respective said end plates and bringing said respective end plates together.

9. A system in accordance with claim 1, wherein:

said first and second clamp fasteners each include a plurality of threaded rods engaging with respective said end plates and bringing said respective end plates together.

10. A system in accordance with claim 9, wherein:

said threaded rod of said clamp connector is arranged at a center of said end plates;

said threaded rods of said first and second clamp fasteners are arranged around said threaded rod of said clamp connector.

* * * * *

UNITED STATES PATENT AND TRADEMARK OFFICE
CERTIFICATE OF CORRECTION

PATENT NO. : 6,652,181 B1
DATED : November 25, 2003
INVENTOR(S) : Hans-Peter Geiger It is certified that error appears in the above-identified patent and that said Letters Patent is hereby corrected as shown below:

<u>Title page,</u>
Item [73], Assignee, should read -- Robert Plersch Edelstahltechnik GmbH --

Signed and Sealed this

Sixth Day of April, 2004

JON W. DUDAS
*Acting Director of the United States Patent and Trademark Office*